United States Patent
Bohan et al.

(10) Patent No.: US 9,063,016 B2
(45) Date of Patent: *Jun. 23, 2015

(54) FAIL SAFE MULTI-SENSOR COMPONENT

(75) Inventors: John Bohan, Avon Lake, OH (US);
John Butkowski, North Ridgeville, OH (US); Timothy Beight, Amherst, OH (US); Christopher Fildes, Elyria, OH (US)

(73) Assignee: R.W. Beckett Corporation, North Ridgeville, OH (US)

( * ) Notice: Subject to any disclaimer, the term of this patent is extended or adjusted under 35 U.S.C. 154(b) by 1460 days.

This patent is subject to a terminal disclaimer.

(21) Appl. No.: 12/435,008

(22) Filed: May 4, 2009

(65) Prior Publication Data

US 2010/0280768 A1    Nov. 4, 2010

(51) Int. Cl.
*G01K 1/00* (2006.01)
*G01K 3/10* (2006.01)
(Continued)

(52) U.S. Cl.
CPC .. *G01K 3/10* (2013.01); *G01K 7/42* (2013.01); *G01K 2201/00* (2013.01); *G01L 19/0092* (2013.01)

(58) Field of Classification Search
CPC .................................. G01K 7/42; G01K 3/10
USPC ................. 700/274, 275, 276–278, 281, 282; 374/107, E01.001, E03.001, 5, 374/101–103, 141–143; 702/50–53, 130, 702/33–35, 42, 47, 133, 138, 166, 182; 236/1 B, 1 C, 1 F, 1 H, 17, 21 B, 21 R, 236/20 R, 22, 23, 24, 24.5, 25 R, 26 R, 44 C, 236/40, 91 R, 91 C, 91 D, 91 F, 92 R, 94, 99 C, 236/99 D, 99 E; 237/7, 8 A, 8 B, 8 C, 8 D, 8 R, 237/2 A, 81; 219/200, 201, 209, 243, 254; 340/501, 584, 588, 693.5; 1/274, 275, 1/276–278, 281, 282
See application file for complete search history.

(56) References Cited

U.S. PATENT DOCUMENTS 5,042,431 A    8/1991  Shprecher et al.
5,190,215 A    3/1993  Habermehl, Jr. et al.
(Continued)

OTHER PUBLICATIONS

U.S. Appl. No. 12/834,451, filed Jul. 12, 2010.
(Continued)

*Primary Examiner* — Sujoy Kundu
*Assistant Examiner* — Ricky Ngon
(74) *Attorney, Agent, or Firm* — Eschweiler & Associates, LLC

(57) ABSTRACT

A system and method is presented for a multi-sensor component for an HVAC system. The multi-sensor component comprises a sensor assembly, having a temperature detector for measuring a temperature of an object or medium, a presence detector to detect the presence of the object or medium against the sensor, and a pressure detector for measuring a pressure of the medium. The temperature, presence and pressure detectors may also be affixed within a single sensor housing. In a heating mode the multi-sensor component is heated by a heater, and in a cooling mode the multi-sensor component cools toward a temperature of the object or medium, and the temperature detector provides temperature data indicative of a temperature response comprising one of a temperature change, a rate of change and a time constant of a thermal decay rate of the multi-sensor component and the presence of the object or medium.

24 Claims, 19 Drawing Sheets

(51) Int. Cl.
*G01K 7/42* (2006.01)
*G01L 19/00* (2006.01)

(56) References Cited

U.S. PATENT DOCUMENTS

| | | | |
|---|---|---|---|
| 5,216,623 | A | 6/1993 | Barrett et al. |
| 5,775,582 | A | 7/1998 | Hammer |
| 5,829,475 | A | 11/1998 | Acker |
| 5,855,320 | A | 1/1999 | Grinbergs |
| 5,861,558 | A * | 1/1999 | Buhl et al. ............... 73/777 |
| 5,984,198 | A | 11/1999 | Bennett et al. |
| 6,032,868 | A | 3/2000 | DiMarco |
| 6,109,339 | A | 8/2000 | Talbert et al. |
| 6,536,678 | B2 | 3/2003 | Pouchak |
| 7,084,377 | B2 * | 8/2006 | Raterman et al. ............. 219/481 |
| 7,240,851 | B2 | 7/2007 | Walsh, Jr. |
| 7,356,548 | B1 | 4/2008 | Culp et al. |
| 7,415,884 | B1 * | 8/2008 | Shaw et al. ............... 73/708 |
| 7,460,933 | B2 | 12/2008 | Chapman et al. |
| 7,831,340 | B2 | 11/2010 | Fusi |
| 7,962,536 | B2 | 6/2011 | Culp et al. |
| 7,966,099 | B2 | 6/2011 | Fima |
| 7,970,494 | B2 | 6/2011 | Fima |
| 2003/0200011 | A1 | 10/2003 | Grauer |
| 2005/0229710 | A1 | 10/2005 | O'Dowd et al. |
| 2005/0258260 | A1 * | 11/2005 | Ahmed .................. 236/51 |
| 2005/0268628 | A1 | 12/2005 | Thompson |
| 2006/0272830 | A1 | 12/2006 | Fima |
| 2007/0000908 | A1 * | 1/2007 | Bohan et al. .................. 219/505 |
| 2007/0085678 | A1 * | 4/2007 | Joy et al. .................. 340/539.26 |
| 2007/0181554 | A1 * | 8/2007 | Nakano et al. ................. 219/216 |
| 2007/0191994 | A1 | 8/2007 | Patterson et al. |
| 2007/0205292 | A1 | 9/2007 | Kwak |
| 2009/0057425 | A1 | 3/2009 | Sullivan et al. |
| 2009/0090789 | A1 | 4/2009 | Zirkiyev et al. |
| 2009/0194831 | A1 | 8/2009 | Casey et al. |
| 2009/0204263 | A1 | 8/2009 | Love |
| 2010/0012291 | A1 | 1/2010 | Sporie |
| 2010/0095906 | A1 | 4/2010 | Leeland et al. |
| 2010/0170794 | A1 | 7/2010 | Gibson et al. |

OTHER PUBLICATIONS

U.S. Appl. No. 12/435,149, filed May 4, 2009, Bohan et al.
U.S. Appl. No. 12/435,238, filed May 4, 2009, Fildes et al.
U.S. Appl. No. 12/435,264, filed May 4, 2009, Fildes et al.
Final Office Action dated Apr. 9, 2012 for U.S. Appl. No. 12/435,264.
Non-Final Office Action Dated Aug. 25, 2011 for U.S. Appl. No. 12/435,149. 30 Pages.
Non-Final Office Action Dated Oct. 11, 2011 for U.S. Appl. No. 12/435,238.
Non-Final Office Action Dated Sep. 2, 2011 for U.S. Appl. No. 12/435,264. 1-22 pgs.
Office Action Dated Aug. 27, 2012 for U.S. Appl. No. 12/834,451.
Non-Final Office Action dated Jul. 5, 2012 to U.S. Appl. No. 12/435,149.
Notice of Allowance dated Dec. 10, 2012 in connection with U.S. Appl. No. 12/834,451.
Non-Final Office Action dated Apr. 4, 2013 to U.S. Appl. No. 12/435,149.
Non-Final Office Action dated Oct. 24, 2013 for U.S. Application No. 12/435,149. 40 Pages.
Final Office Action dated Jul. 10, 2014 U.S. Appl. No. 12/435,149.
Non-Final Office Action dated Dec. 5, 2014 U.S. Appl. No. 12/435,149.

* cited by examiner

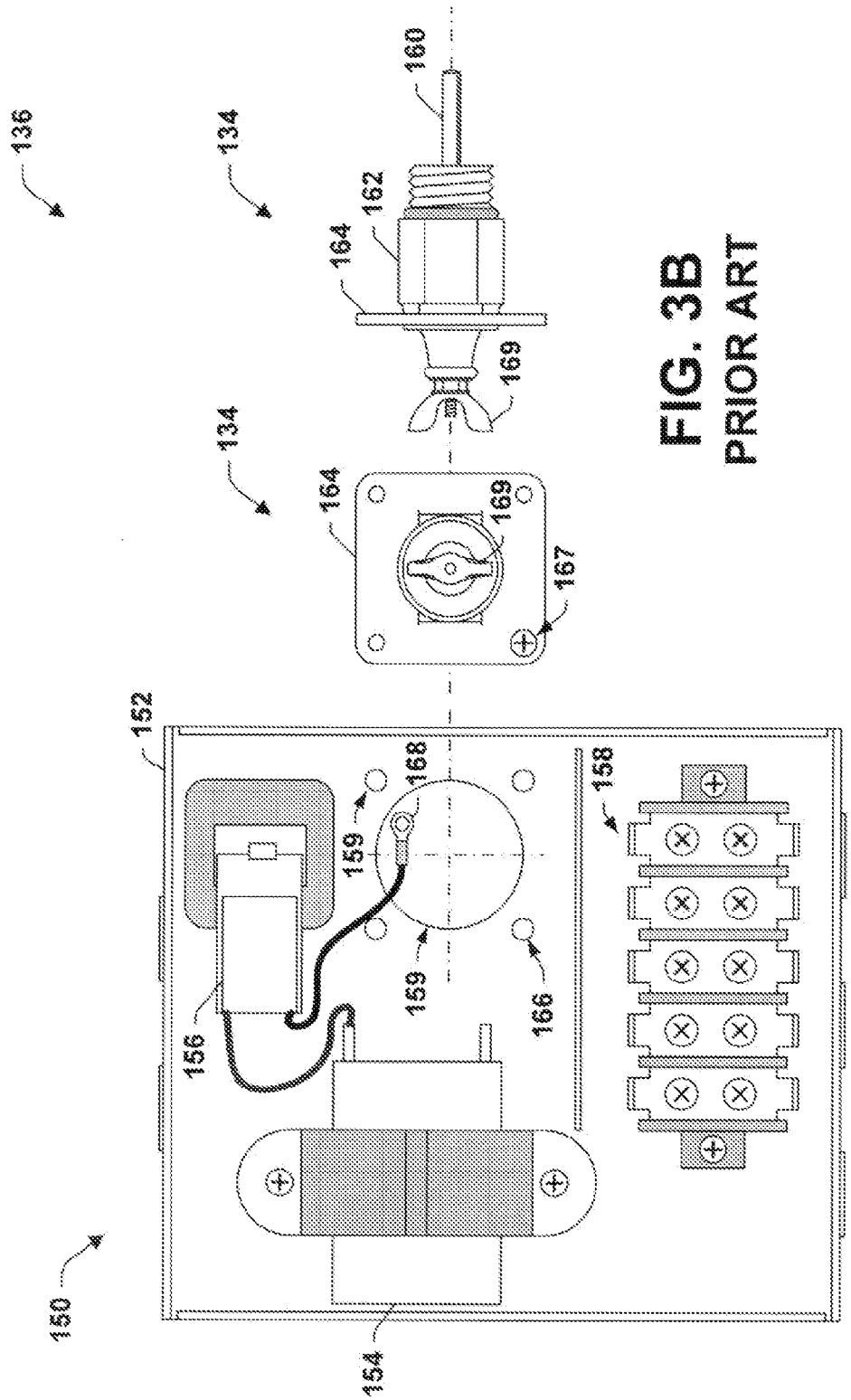

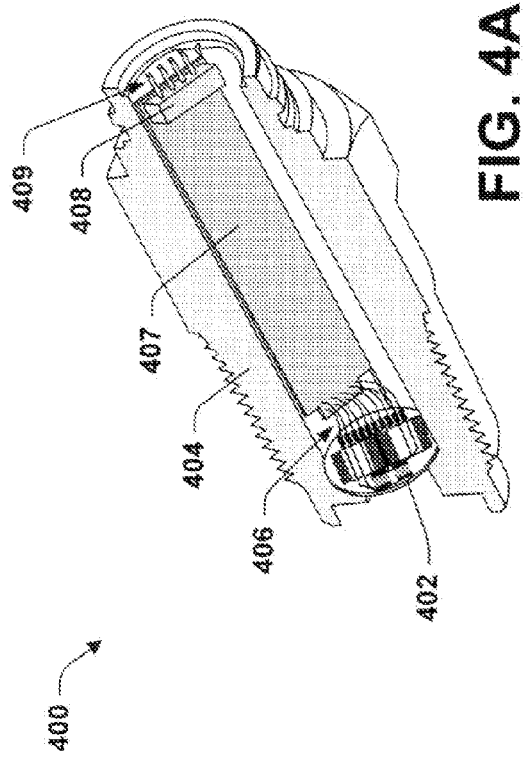
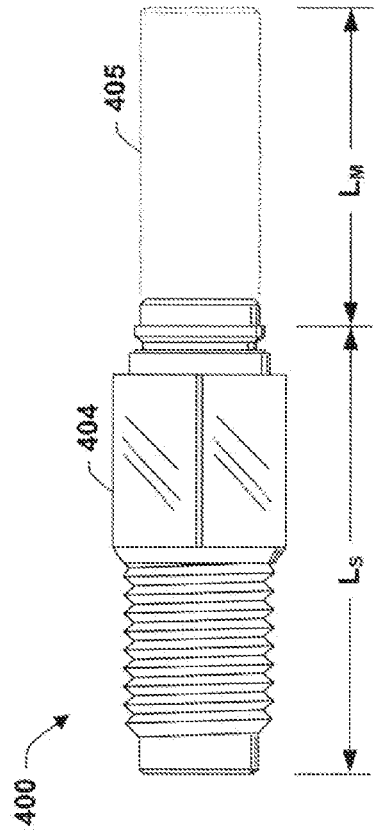
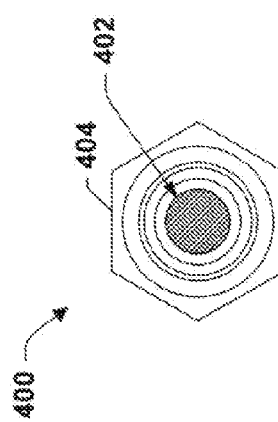
FIG. 4A
FIG. 4C
FIG. 4B

FAIL SAFE MULTI-SENSOR COMPONENT

FIELD OF INVENTION

The present invention relates generally to sensors and more particularly to sensor systems and algorithms that operate in a fail-safe manner to detect the temperature, pressure and presence of a medium within a heating, ventilating, or air-conditioning (HVAC) system.

BACKGROUND OF THE INVENTION

Heating systems employ various methods to control the temperature of components within the system. The temperatures of these components are usually regulated within a particular range in order to maintain safe operation. Two such components that require regulation are heat exchangers of furnaces and the water inside a pressurized hot water boiler. Redundant sensors are often used in safety-related components such as these, which provide greater confidence that the sensors are operating properly. Two or more such sensors may reduce the probability of the heating control system recognizing an incorrect temperature, however, the proper functionality of the additional sensors are not known with any greater confidence than the initial sensor.

Temperature measurement is important in many such processes. A common method of temperature measurement uses thermocouple transducers that output an EMF in response to a temperature gradient across two dissimilar materials, typically metals. It is well known, however, that thermocouples degrade over time due to chemical and metallurgical changes in the composition of the materials. Various thermal sensors and detectors such as thermistors, platinum resistance elements, and other types of temperature sensors are also utilized in many heating, ventilation, and air-conditioning (HVAC) applications.

Most temperature sensors used in these HVAC applications, whether used in industrial, commercial, or residential markets, eventually suffer from some form of serious degradation and/or failure of the sensor. Such degradation or failure modes of temperature detectors include thermal degradation, metal fatigue, and corrosion, chemical and mechanical changes, which may render the sensor inoperable or induce a system failure.

During the use of thermocouples, for example, several forms of degradation take place in the thermocouple circuit including chemical, metallurgical, and mechanical changes in the materials and elements or devices of the circuit. Such changes may be accompanied by a shift in the resistivity of the thermoelement, thereby indicating a false temperature measurement.

Heating applications likely produce the greatest potential for sensor failures, where the sensor is particularly susceptible to extremes of thermal degradation and chemical changes. These sensors may include temperature, pressure, flow, and medium presence sensors, and others such as may be used in furnaces and boilers. The exposed portion of the sensor is often the hottest portion of the measurement circuit and may therefore be exposed to the harshest conditions. These HVAC sensors are also exposed to processes that may increase the likelihood of changes in the electrical properties of the sensor or cause a complete system failure.

In boiler applications, for example, temperature, pressure, flow, and medium presence detection may be used, wherein the failure of a temperature sensor or an associated low water level cutoff detector may cause a boiler malfunction or failure. Thus, the failure of such boiler sensors poses a problem.

In furnace applications, the temperature sensors and/or limit detectors used in a heat exchanger of a furnace may also reach very high temperatures, and cause overheating conditions that could cause the system to fail. Accordingly, a fail-safe temperature sensor, and/or a fail-safe low water level cut-off detector and/or a pressure sensor would be desirable to avoid such problems.

For design, manufacturing, and applications reasons, the HVAC sensors discussed above are generally individually fabricated, packaged and mounted. However, the use of these numerous individual sensors also requires more system mounting difficulties, additional wiring and added complexity in support of the remaining portion of the control system. Such additional support components and circuitry may include related relays, power supplies, and microprocessors that increase the overall cost and complexity of the system.

In many applications, however, several specific sensors are commonly used together. For example, in the case of boiler heating systems, a boiler water temperature sensor is usually accompanied by a low water cutoff detector, which senses the presence of the water (or another such medium) when strategically placed at the low water level of the boiler. If the water falls below this level, the system is typically shut-down until more water is added, thereby immersing the sensor again. In addition, pressure sensors and/or pressure relief valves are usually included in boiler systems to monitor and/or relieve over-pressure conditions such as in the event the boiler overheats producing steam and an excessive pressure build-up. A pressure sensor is useful to monitor for such failsafe conditions, particularly if the water falls below the low water level.

Accordingly, for fail-safe readings and operations, cost, mounting and system simplicity reasons, there is a need for a fail-safe sensor of a monitoring system that incorporates temperature, pressure and medium presence detection functions in a single housing.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention is directed to a fail-safe multi-sensor component for an HVAC system for detecting a temperature, pressure, and a presence of an object or a medium within the HVAC system in a fail-safe manner. The fail-safe multi-sensor component comprises a sensor assembly, comprising a temperature detector operable to measure a temperature of an object or a medium. The sensor assembly also comprises a presence detector operable to detect the presence of the object or medium in contact with the multi-sensor component, and a pressure detector operable to measure a pressure of the medium against the multi-sensor component. The fail-safe multi-sensor component also comprises a sensor housing comprising the temperature detector, the presence detector and the pressure detector affixed therein.

In another embodiment, the presence detector comprises a heater operable to either heat the multi-sensor component to an expected temperature as measured by the temperature detector or to heat the multi-sensor component with a predetermined energy, and in a heating mode, the multi-sensor component is either heated by the heater to the expected temperature as measured by the temperature detector or is heated with the predetermined energy, and in a cooling mode the multi-sensor component cools toward a temperature associated with the object or medium, and the temperature detector provides temperature data indicative of a temperature response comprising one of a temperature change, a rate of change and a time constant of a thermal decay rate of the multi-sensor component and the presence of the object or medium.

In still another embodiment of the present invention, a multi-sensor component for detecting water temperature, water pressure, and the presence of water in a boiler, comprises a temperature detector, a heater and a pressure detector provided within a single sensor housing. The multi-sensor component includes the heater comprising one or more heating elements, and the pressure detector operable to measure a pressure of the water against the sensor housing. The multi-sensor component is located at a low water cut-off level location in the boiler for immersion by the water on a wet side of the sensor housing, wherein a controller is connected to electrical terminals of the temperature detector, the heater, and the pressure detector affixed to a dry side of the sensor housing.

In yet another embodiment, the heater is operable in a heating mode to either heat the multi-sensor component to an expected temperature as measured by the temperature detector or to heat the multi-sensor component to the expected temperature with a predetermined energy. In a cooling mode, the heater cools toward the temperature associated with the water measured by the temperature detector. The controller calculates the a temperature response comprising one of a temperature change, a rate of change and of the thermal decay rate of the multi-sensor component based on the measurements of the expected temperature and the temperature of the water, the a temperature response indicative of the presence of water against the wet side of the multi-sensor component, and the controller also determines the pressure of the water against the wet side of the multi-sensor component.

In one aspect of the present invention, a method is disclosed for detecting a temperature, a pressure and a presence of an object or a medium within an HVAC system using a multi-sensor component comprising a temperature detector, a heater and pressure detector integrated onto a dry side of a sensor housing further comprising a wet side. The method comprises heating the heater on the dry side of the multi-sensor component, and measuring a first temperature with the temperature detector on the dry side of the multi-sensor component, a predetermined time period after heating the heater. The method further comprises removing the heating from the heater and allowing the multi-sensor component to cool-down toward a temperature associated with the object or medium, and measuring a second temperature with the temperature detector of the multi-sensor component during the cool-down. The method then computes a temperature response comprising one of a temperature change, a rate of change and a time constant TC of the thermal decay rate of the multi-sensor component based on the measured first and second temperatures, and based on an elapsed time delay between the first and second temperature measurements. Finally, the method determines the presence of the medium with respect to the wet side of the sensor housing of the multi-sensor component, by comparing the computed temperature response of the multi-sensor component to a first expected or first expected temperature response level corresponding to that of a multi-sensor component immersed in the medium.

In another embodiment, the pressure of the object or medium against the wet side of the multi-sensor component may be determined, comprising applying a voltage to the pressure detector comprising a strain gage bridge, measuring a differential voltage resulting from a deflection in the strain gage bridge on the dry side of the common substrate as a result of the pressure of the object or medium against the wet side of the sensor housing, and outputting a pressure signal from the multi-sensor component corresponding to the measured differential voltage.

Thus, by incorporating into one sensor housing multiple sensors, the multi-sensor component of the present invention eliminates the need for separate and relatively costly medium presence detection (e.g., low water cutoff) devices and controls (e.g., related relays, power supplies, and microprocessors) currently used in conventional HVAC systems.

In another implementation of the present invention, the multi-sensor component is used to measure the temperature of a heat exchanger, an outlet plenum, an air stream, a chamber wall, a stack, or other component, for example, in a furnace or another HVAC system. In such a case, the temperature response is used to indicate whether the sensor has adequate thermal contact with the furnace component or has become loose or separated from the furnace component.

In yet another aspect of the invention, the HVAC system may be one or a combination of a furnace, a boiler, a ventilation system, a refrigeration system, or an air-conditioning system.

Detecting the temperature or presence of other solids or liquids surrounding the sensor is also anticipated in the context of the systems and methods of the present invention.

A detection system of the present invention monitors the resistance of a temperature detector or the heater while alternately heating and cooling a heater to identify the regulation temperature and calculate the temperature response of an object or a medium surrounding a sensor in an HVAC system, thereby providing a determination of the health of the sensor and/or the presence (or absence) of the medium.

The present invention further provides an algorithm for HVAC systems to identify a temperature, a low medium alarm, and a failed sensor alarm in a sensor measurement circuit. For example, the algorithm, according to one aspect of the invention, utilizes one or more values supplied by the manufacturer of the sensor and one or more expected temperature response (e.g., time constant TC) levels for comparison to the calculated temperature response levels, whereby the presence (or absence) of the medium is determined based on the comparison results.

For example, a first expected (cool-down) temperature response level is initially input into the analyzer for use by the algorithm corresponding to a medium (e.g., water) present at a low water level cut-off location of the multi-sensor component. If a determination is made upon comparison that the computed temperature response level has exceeded the first expected temperature response level, the medium is present at the multi-sensor component, however, if the first expected temperature response level is not exceeded, the medium is absent from the multi-sensor component, and a low water cut-off alarm is generated. If the computed temperature response has not exceeded a second expected (cool-down) temperature response level, or if a third predetermined (warm-up) temperature response level is not exceeded, a sensor maintenance alarm may be generated.

Thus, by applying parameters specific to the temperature detector, pressure detector and heater of a sensor used in a monitoring system, added accuracy is obtained in determining, for example, the temperature response level for the applicable medium used in the HVAC system using the algorithms of the present invention. Further, it is anticipated that the algorithms used in the methods and temperature monitoring system of the present invention may be used to identify degradation of the sensor in order to predict a future potential sensor system failure therein.

The temperature monitoring system of the present invention comprises a temperature and pressure sensor, a storage component, and a controller or analyzer comprising an algorithm for identifying a temperature, a pressure, a low medium alarm, a sensor alarm, and optionally for predicting certain types of impending failures of the temperature sensor or the HVAC system. The controller/analyzer of the monitoring system is operable to receive sensor parametric input values available from the sensor, monitor a plurality of two or more sensors (e.g., RTD, thermistor, thermocouple) inputs, monitor the temperature detector resistance of the sensor, supply or remove a voltage (e.g., from a power supply) to the heater of the sensor for heating or cooling the sensor, and calculate and store the parameters and expected TC levels in the storage component. In response, the controller/analyzer may then provide one or more of a temperature detection, a pressure detection, a low medium alarm, a sensor alarm, and a failure prediction based on an analysis of the multi-sensor component (e.g., resistance) measurement results from the algorithm.

For example, the detection system may, according to one aspect of the invention, monitor the resistance of a detector for changes that are analyzed and determined to be due to a level of sensor degradation greater than a predetermined acceptable level. Although only the detector resistance need be monitored, an accurate determination may be made using the algorithm and several parameters of the temperature detector from the manufacturer.

In accordance with another aspect of the invention, by creating a time-series history of periodic multi-sensor component TC level calculations, a prediction of an imminent multi-sensor component or HVAC system failure, or a prediction of a next expected value may be provided by the monitoring system.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

FIGS. 3A and 3B are prior art diagrams illustrating a conventional low water cut-off device having a controller and sensor, respectively, such as may be used in the prior art hot water boiler system of FIG. 1;

FIGS. 4A-4C illustrate an isometric cross-sectional diagram, end and side views, respectively, of an exemplary multi-sensor component used in accordance with an aspect of the present invention, the sensor having a temperature detector, a heater and a pressure detector provided within a single housing, such as may be used in a fail-safe manner to monitor the temperature, pressure and the presence of an object or medium within an HVAC system;

DETAILED DESCRIPTION OF THE INVENTION

Figure 1:
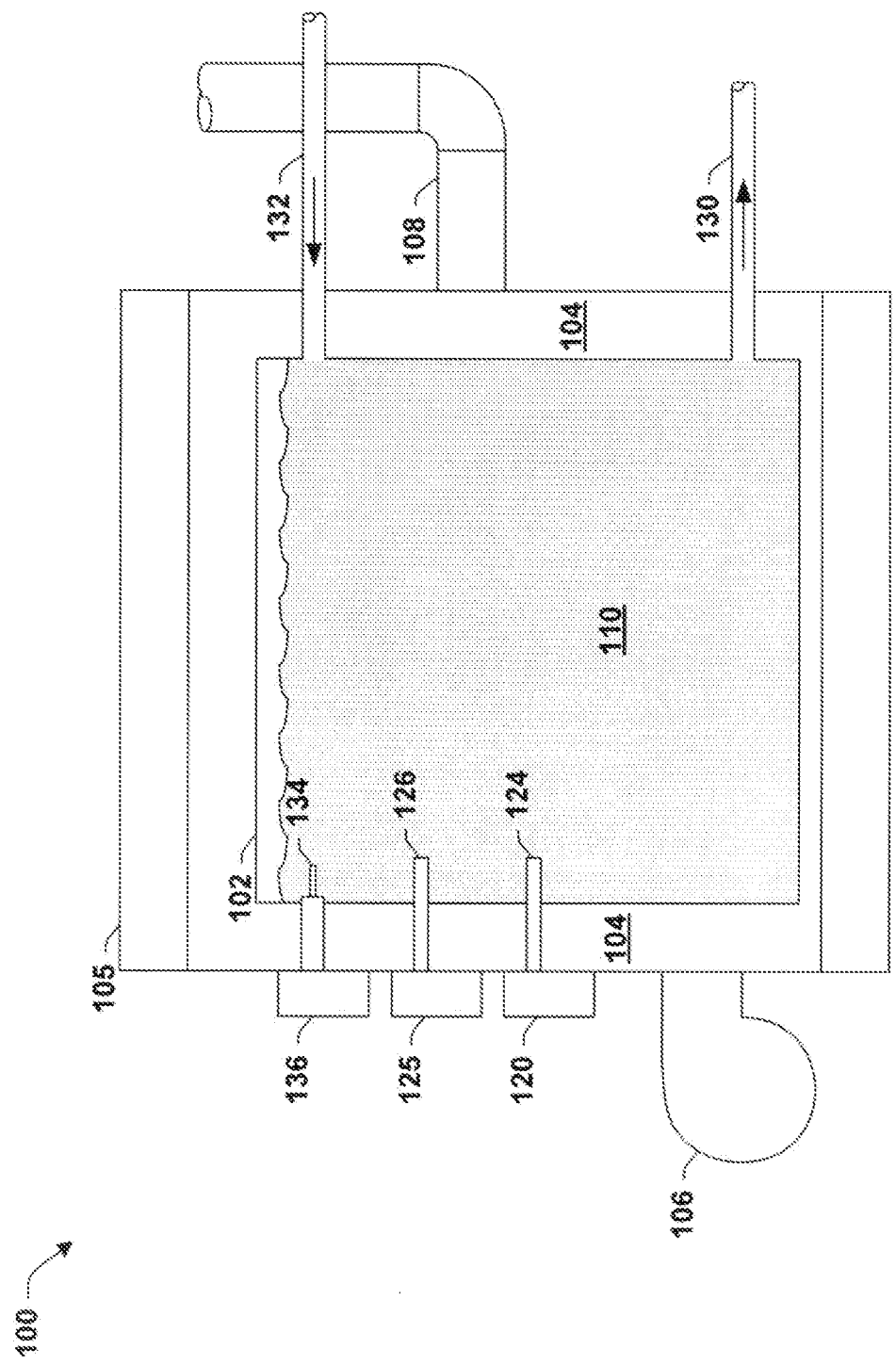
FIG. 1 is a simplified diagram of a prior art hot water boiler system using a separate conventional temperature sensor for measuring the temperature of the water, a pressure detector and a low water cut-off detector used to detect the presence of water in the boiler.

The present invention will now be described with reference to the attached drawings, wherein like reference numerals are used to refer to like elements throughout. The invention relates to a fail-safe multi-sensor component and method for detecting a temperature, pressure and the presence of an object or a medium within a heating, ventilating, and air-conditioning (HVAC) system or another such system in a fail-safe manner. The fail-safe sensor of the present invention incorporates the functions of a heater a temperature detector and pressure detector within a single sensor housing. In one aspect of the invention, the fail-safe sensor of the present invention comprises a heater such as a resistive heating element that is operable to heat the multi-sensor component to an expected temperature as measured by the temperature detector, for example, when supplied with power.

In one implementation, the temperature detector of the multi-sensor component comprises one or more of an RTD, a PTC thermistor, an NTC thermistor, a platinum or nickel resistance wire element, a thermocouple, and an integrated circuit temperature detector in close thermal proximity to the heater provided within a single sensor housing.

In another implementation, the heater of the multi-sensor component comprises one or a combination of a Platinum resistive element, a PTC thermistor and an integrated circuit heater operable to heat the fail-safe multi-sensor component to the expected temperature as measured by the temperature detector. Alternately, the heater may also serve as the temperature detector when the heater element is not being heated.

When used in a hot water boiler application, a goal of the fail-safe multi-sensor component of the present invention is to combine the functions of a temperature detector and a low water cut-off device, and a pressure detector or over-pressure detector within a single sensor. Conventionally, these functions typically require the use of separate devices, which add system complexity as well as cost for the added supporting components (e.g., relays, power supplies, microprocessors, housings, wiring) and for the individual device mounting costs.

Fail-safe operation is obtained in several ways in the present system and method. For example, by providing the sensor (or multi-sensor component) the ability to confirm that the temperature detector is working properly, and by using redundant heater elements and redundant temperature detectors. To confirm that one or more of the temperature detectors is working properly, in one aspect of the present invention, an algorithm is provided which is used to monitor the health of the sensor and to detect an object or medium in contact with the sensor. When heated to the expected regulating temperature, the temperature signal of the temperature detector is compared with a known regulated temperature of the heater, using a measured heater current or power input to confirm whether the sensor is presenting an accurate temperature signal to an analyzer or controller. The analyzer or controller may also be included in the multi-sensor component to monitor and/or compare the detector temperature signals from the one or more temperature detectors and supply a measured heating current/power to the heater(s). The analyzer/controller may also be used to provide a conditioned output of the temperature, pressure and presence signals onto a 2-8 wire bus, for example. The multi-sensor component is then allowed to cool back down to the temperature of the surrounding medium within the system or component it is designed to sense. This method may be thought of as an active sensing method. In this way, the temperature of the system or component may be then measured with greater confidence than that which may be provided with a single sensing device or multiple individual sensing devices.

Thus, the multi-sensor component of the present invention combines temperature, pressure and presence detection having failsafe operations within a single sensor housing, such as brass, stainless steel or Noryl in such a way as to eliminate a thermo-well and the problems associated with thermo-wells.

Initial parameters or calibration data of the specific thermoelements used in the sensor may be supplied by the manufacturer or otherwise ascertained in another manner and used in the algorithm or controller of the multi-sensor component. These parameters may be useful for increasing the accuracy of the temperature measurements, for calibration purposes, or for establishing various setpoints. In addition, inputting one or more predetermined acceptable or expected levels of temperature response such as a temperature change, a rate of change and a thermal decay rate time constants may be useful for identification of specific medium densities, for identification of sensor degradation levels and failure predictions, or to limit the range of set points to match appliance limitations. In order to better appreciate one or more features of the invention, several exemplary implementations of the temperature, pressure and presence detection system, the temperature, pressure and presence detection method, and several types of system outputs is hereinafter illustrated and described in association with the following figures.

FIG. 1 illustrates a prior art hot water boiler system 100, wherein a conventional temperature sensing control device is used for measuring and controlling the boiler based on using separate water temperature and pressure sensors, and a separate conventional low water cut-off detector used to detect the presence of water in the boiler for safe operation thereof. Numerous types of common temperature and pressure sensing devices or sensors are utilized in such HVAC systems, including those based on thermocouples, thermistors, and fluid filled copper bulbs to help regulate the temperature and level of water within the boiler.

The conventional boiler 100 of FIG. 1, comprises a boiler tank 102 surrounded by an insulating material layer 104 within a boiler enclosure 105. A burner 106 having a flue vent 108, heats water 110 (or a water/glycol mix) within the tank 102 to a temperature set by a temperature sensing control device 120. The temperature sensing control device 120 has, for example, a fluid filled copper bulb 124, which expands when heated to actuate a high/low limit module for control of the system about a temperature set point. The heated water 110 is circulated through a feed water line 130 to an external heat exchanger (not shown) and the cooled water returns to the boiler through a supply/return line 132. If the level of the water 110 within the boiler tank 102 drops below the level of a live probe 134 of a low water cut-off device 136, the burner 106 is shut-down until further water 110 is added to the boiler 100 to maintain safe operation by avoiding boiler damage.

In addition, the boiler 100 may further comprise a water pressure sensor 125 utilizing a pressure sensing bulb or diaphragm 126 operable to sense the pressure of the water 110 within the tank 102. The pressure sensor 125, for example, may then use the detected pressure, to safely control a shutdown of the boiler in the event of an over-pressure condition, and to avoid dumping water through a pressure relief valve into the boiler room.

Figure 2:
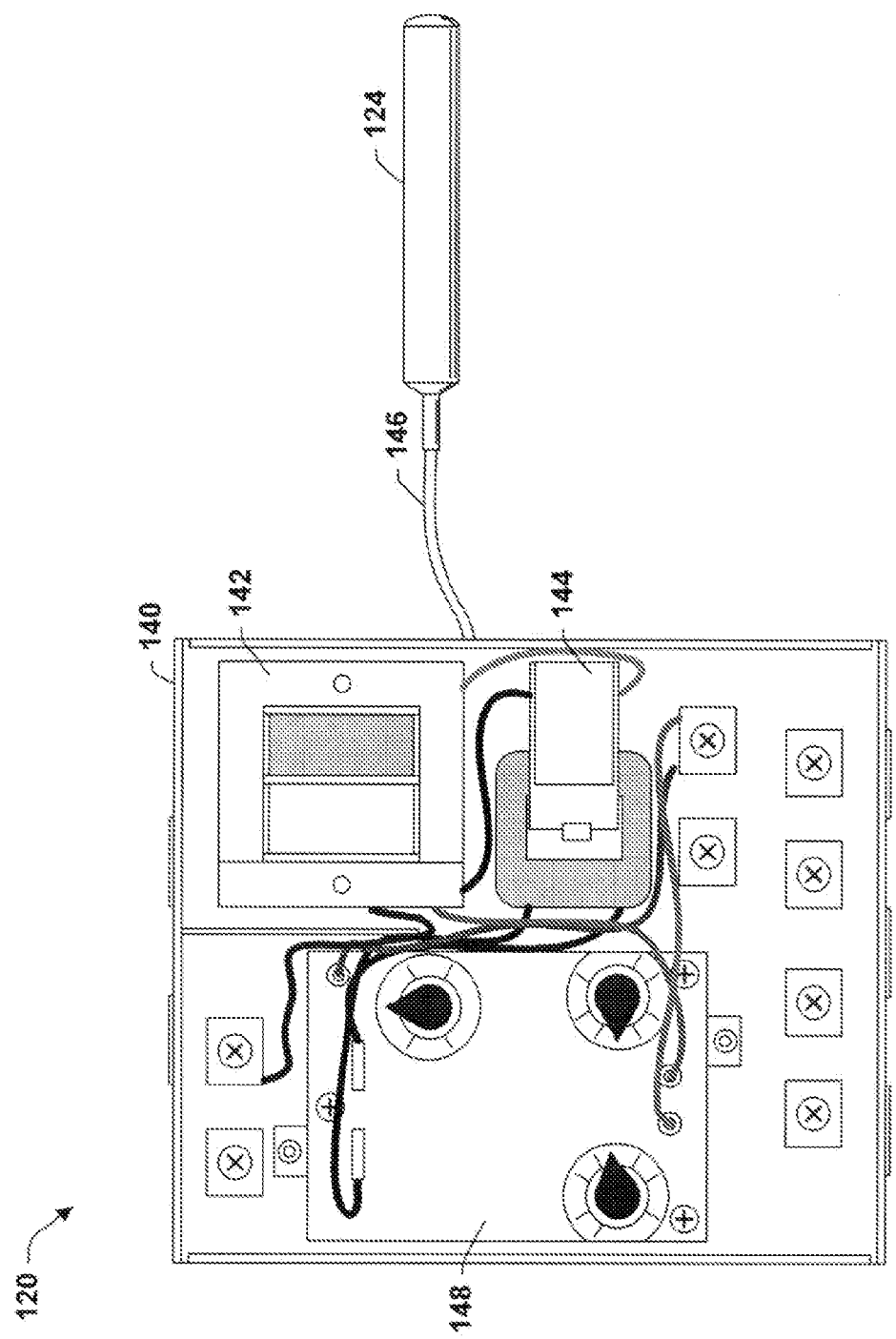
FIG. 2 is a prior art diagram illustrating a conventional temperature sensing control device such as may be used in the prior art boiler system of FIG. 1.

FIG. 2 illustrates a prior art temperature sensing control device 120 such as may be used in the prior art boiler system 100 of FIG. 1. The temperature sensing control device 120 comprises a control housing 140 containing a transformer 142 that supplies power to a room thermostat (not shown), which closes to energize a relay 144. The fluid filled copper bulb 124 is inserted into a well or opening within the boiler tank 102. When the boiler temperature increases, for example, the liquid expands thru copper tubing 146, pushing against a diaphragm that actuates (opens/closes) contacts within a high/low limit module 148. If the thermostat calls for heat (contacts closed), the relay 144 turns the burner 106 on, if the boiler 100 water temperature is not overheated. Relay 144 also turns on a water circulator (not shown) if the water is warm enough. The limit module 148 will also turn on the burner 106 if the boiler temperature gets too cold. Such temperature sensing control devices 120 may include an electronic sensor, processors, and relays in place of the liquid filled bulb 124 type temperature sensor.

FIGS. 3A and 3B illustrate an exemplary conventional low water cut-off device 136 having a controller 150 and a live probe sensor 134, respectively, such as may be used in the prior art hot water boiler system 100 of FIG. 1.

The low water cut-off controller 150 of FIG. 3A comprises a control housing 152 containing a control transformer 154, a control relay 156, a wiring terminal strip 158, and an access/mounting holes 159 for the live probe 134. The live probe 134 of FIG. 3B comprises a conductive probe 160 insulated within a metal body 162 attached to a mounting plate 164. The mounting plate 164 of the live probe 134 is brought to a ground potential at 166, by affixing the mounting plate 164 within the control housing 152, inserting the probe 134 within a separate boiler well or opening (as in FIG. 1), and attachment of one or more ground screws 167. A wire 168 from the coil of the relay 156 connects to the wing nut 169 on a threaded portion of the conductive probe 160. For simplicity and clarity, not all wires are shown in the controller 150.

In operation, transformer 154 supplies voltage through the coil of the relay 156 to the live conductive probe 160, which is mounted into the boiler 100 and insulated from equipment ground 166. If there is water 110 in the boiler 100, current will flow through the coil of relay 156 and the live probe 134 through the water 110 to ground 166, pulling in the relay 156 and passing line voltage power (e.g., 120 VAC) to the burner 106.

Thus, in the conventional boiler system configuration 100, separate water temperature and pressure sensing and water presence detection may be required for operation in a safe manner. Accordingly, added devices, and related equipment costs, including added mounting costs are typically needed in a prior art system.

FIGS. 4A-4C illustrate an isometric cross-sectional diagram, end and side views, respectively, of an exemplary multi-sensor component 400 used in accordance with an aspect of the present invention. The multi-sensor component (or sensor) 400 comprises a sensor assembly 402 comprising a temperature detector, a heater and a pressure detector provided within a single sensor housing (or spud) 404, such as may be used in a fail-safe manner to monitor the temperature, pressure and the presence of an object or medium (e.g., 110) within an HVAC system. The multi-sensor component 400 may also comprise a controller or analyzer 407 (e.g., microprocessor, PIC, microcomputer, computer, PLC, e.g., on a printed circuit board, PCB) connected to the sensor assembly 402 via interconnect wiring 406. The controller 407 may further comprise control circuitry and an algorithm operable to condition and provide outputs for temperature, pressure and presence signals from the temperature and pressure detectors, for example, onto a bus 409 by way of a bus connector 408. Other such connectors and bus configurations are also contemplated within the context of the present invention.

The multi-sensor component 400 may have a basic sensor length $L_S$, or optionally, may be provided having an optional extension 405 having a mounting length $L_M$, for mounting an optional display panel (not shown) having additional controls and external connection terminals.

Figure 4D:
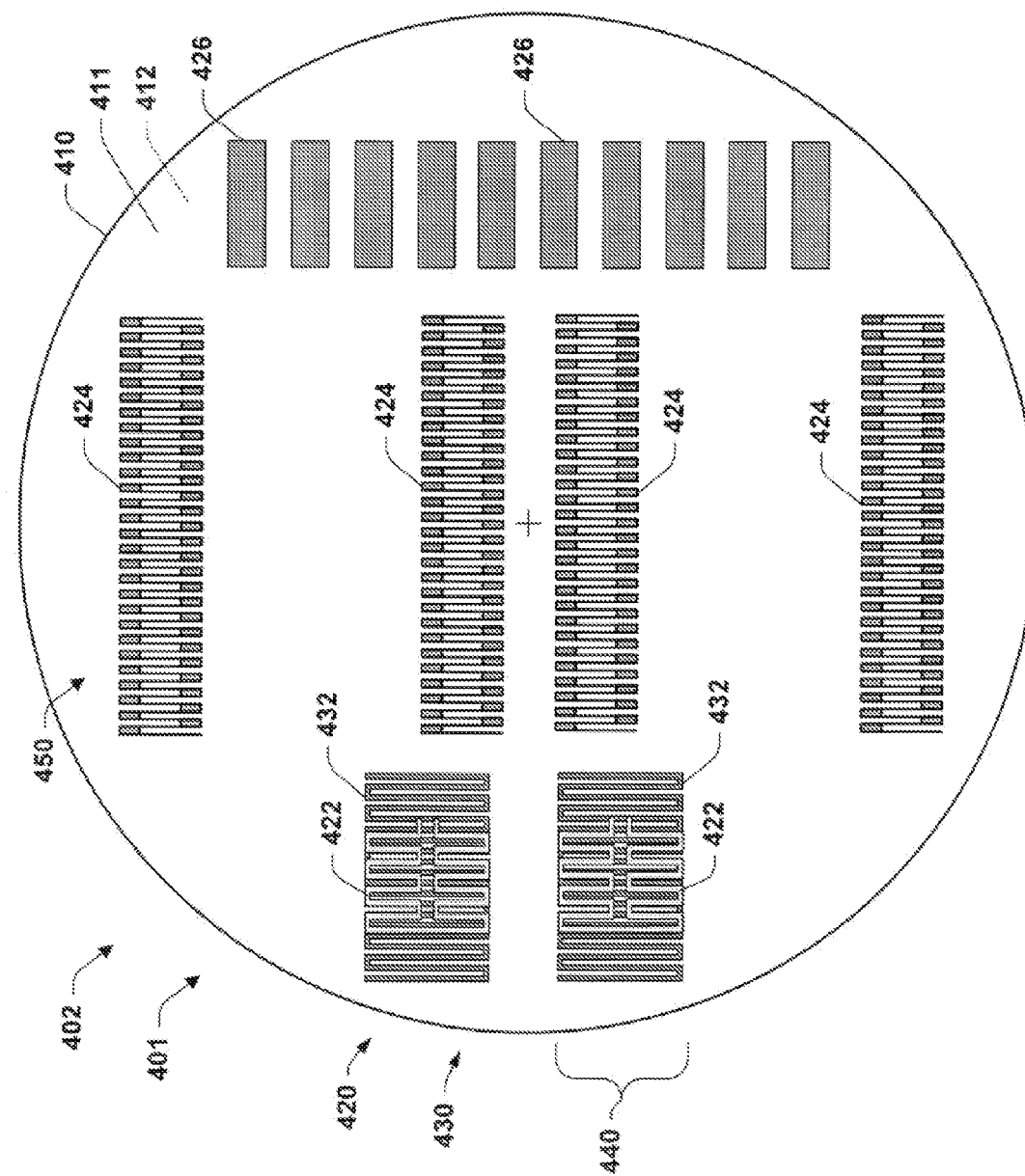
FIGS. 4D and 4E illustrate simplified diagrams of an exemplary sensor assembly sensor pattern and wiring pattern, respectively, of the multi-sensor component of FIGS. 4A-4C used in accordance with an aspect of the present invention, the sensor assembly having a heater, a temperature detector and a pressure detector provided together within a single sensor housing and/or on a common substrate, such as may be used to monitor the temperature, pressure and the presence of an object or medium within an HVAC system.
Figure 4E:
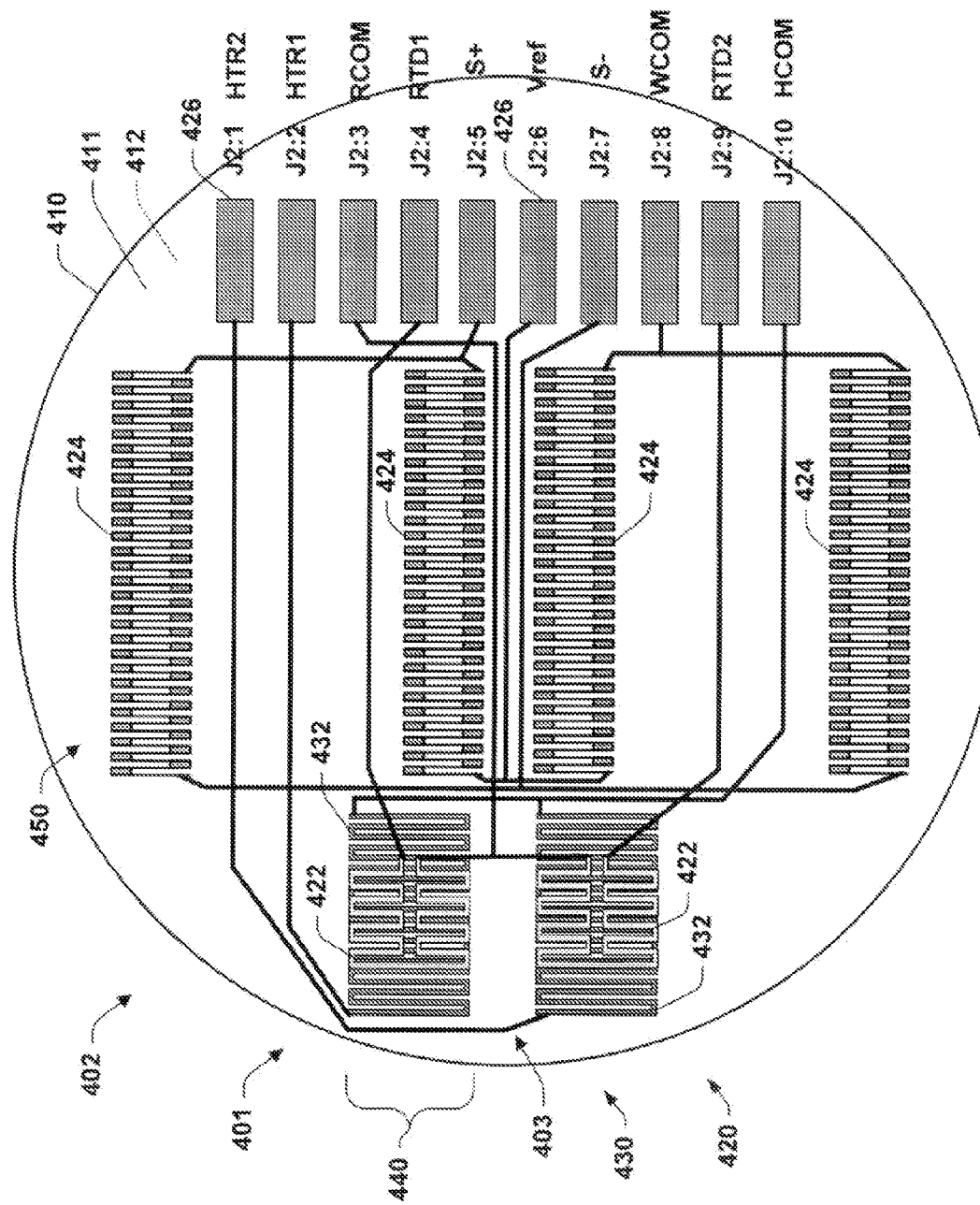

FIGS. 4D and 4E illustrate simplified diagrams of an exemplary sensor assembly 402, a sensor pattern 401 (FIG. 4D) and a wiring pattern 403 (FIG. 4E), respectively, of the multi-sensor component 400 of FIGS. 4A-4C used in accordance with an aspect of the present invention. The sensor assembly 402, again, comprising a temperature detector 420, a heater 430, and a pressure detector 450 provided together within a single sensor housing 404 and/or on a common substrate 410, such as may be used to monitor the temperature, pressure and the presence of an object or medium within an HVAC system, such as the boiler system 100 of FIG. 1.

In one implementation, the temperature detector 420 of the multi-sensor component 400 may comprise one or more (e.g., 2) temperature detector elements or detectors 422, the heater 430 may comprise one or more (e.g., 2) heater elements 432, and the pressure detector 450 may comprise two or more (e.g., 4) strain gauge elements 424. For example, the pressure detector 450 of FIGS. 4D and 4E comprises four strain gauge elements 424 interwired together by wiring pattern 403 of FIG. 4E configured as a full-wave strain gauge bridge or Wheatstone bridge 450. The configuration of the Wheatstone bridge 450 as a pressure detector is well known in the art and provides a high level of pressure signal for a given strain on the substrate or disc 410 to which the strain gauge elements are affixed. The substrate/disc 410, for example, may comprise a ceramic, stainless steel, silicon, a composite, a fiber reinforced composite, and metal material. Preferably, the substrate materials generally comprise a relatively high tensile strength to take the flexure of the medium pressure, as well as a high thermal conductivity to quickly and accurately convey the temperature of the object or medium to the temperature and presence detectors.

In one embodiment, the single or common substrate 410 (one common substrate between the various elements/detectors) has wet 412 and dry 411 opposing sides, having the wet side 412 in direct contact with a medium (e.g., water, Freon, ammonia, or alcohol, refrigerant, water-glycol mixture) or an object (e.g., a heat exchanger, an outlet plenum, an air stream, a chamber wall, and a stack of a furnace system). In this embodiment, the temperature detector 420, the heater 430 and the pressure detector 450 are affixed onto the dry side 411 of the single/common substrate 410. The temperature detector 420 and the heater 430, together, also comprise a presence detector 440, as will be discussed further in association with FIG. 4J.

In the illustrated embodiments, the substrate 410 effectively serves as one wall (e.g., the outer wall) of the sensor housing 404, and is accordingly made relatively thin so as to flex in response to pressure changes measured by the pressure detector 450, and to also rapidly thermodynamically transfer the present temperature of the medium/object to the temperature detector 420.

It will be appreciated that in the present context and description above that "wet and dry opposing sides" refers more to the function of the particular side in terms of which side faces the medium/object (wet side 412), and upon which side the detectors and heater are affixed (dry side 411), rather than which side may physically become "wet or dry". However, in the illustrated examples, the "dry side" 411 upon which the detectors and heater are affixed generally is kept substantially dry simply as a result of the physical construction of the enclosed sensor housing 404. In addition, the opposing "wet side" 412 may physically become "wet" if the medium is water, but conversely may effectively stay "dry" if the medium is Freon, a refrigerant, a gas or air, or if the wet side 412 is used to sense an object such as a heat exchanger, an outlet plenum, an air stream, a chamber wall, and a stack of a furnace system, for example.

In one implementation, the temperature detector 420 of the multi-sensor component 400 may comprise one or more temperature detector elements 422 comprising one or more of an RTD, a PTC thermistor, an NTC thermistor, a platinum or nickel resistance wire element, a thermocouple, and an integrated circuit temperature detector, or a combination thereof, preferably in close thermal proximity to the heater 430. For example, FIGS. 4D and 4E illustrate that one such temperature detector 422 directly overlies one heater element 432, the combination thereby comprising a presence detector 440.

In another implementation, the heater 430 of the multi-sensor component 400 may comprise one or more heater elements 432 comprising one or more of a Platinum or nickel resistive element, a PTC thermistor and an integrated circuit heater, or a combination thereof, operable to heat the multi-sensor component to an expected temperature as measured by the temperature detector 420. In another embodiment, the heater 430 may also serve as a temperature detector 420 when the heater 430 is not being heated.

In another embodiment, the substrate 410 of the multi-sensor component 400 may further comprise conductive material bond pads 426 (e.g., Ti, Ni, Cu, Pt or Au) coupled by way of the conductive interwiring 403 (e.g., Ti, Ni, Cu, Pt or Au) to the various elements of the temperature detector 420, the heater 430 and the pressure detector 450. The conductive bond pads 426 provide an external means of electrical connection to the temperature detector 420, the heater 430 and the pressure detector 450 affixed to the dry side 411 of the substrate 410, for example, to the controller/PCB 407 by way of interconnect wiring 406.

In yet another embodiment, the multi-sensor component 400 may comprise one or more temperature detectors 420, one or more heaters 430 and one or more pressure detectors 450 as individual devices affixed within the sensor housing 404, affixed to an interior wall of the sensor housing 404, or a combination thereof. For example, a pressure detector 450 may be affixed to an interior wall of the sensor housing 404, and a presence detector 440 comprising a temperature detector 420 intimately thermally paired with a heater 430 may be individually affixed within the sensor housing 404, yet separate from the pressure detector 450.

In still another embodiment, the multi-sensor component 400 may comprise a presence detector 440 individually affixed within the sensor housing 404, while a separate individual pressure detector 450 may be affixed, bonded, or deposited onto a substrate 410 as indicated above, the substrate acting as one wall of the sensor housing 404 having a dry side 411 and an opposing wet side 412.

In one embodiment the one or more temperature detectors 420, one or more heaters 430 and one or more pressure detectors 450 as individual devices may be cast or potted together within the sensor housing 404, for example, using silicon rubber, thermal epoxy, or a ceramic material to provide a close thermal union between the elements. The close thermal union between the temperature detector and the heater provides a quick and more accurate thermal response therebetween and to the surrounding environment or medium.

It is a goal in one aspect of the present invention to minimize the distance and maximize the thermal union between the temperature detector 420 and the heater 430. It is another goal in one aspect of the present invention to minimize the mass of the temperature detector 420 and the heater 430. In these ways, the responsiveness of the multi-sensor component 400 to the surrounding medium (e.g., 110, 510) or object, and to each other of the elements therein may be maximized. A thin substrate such as the substrate 410 illustrated and described herein provides these goals.

Figure 4F:
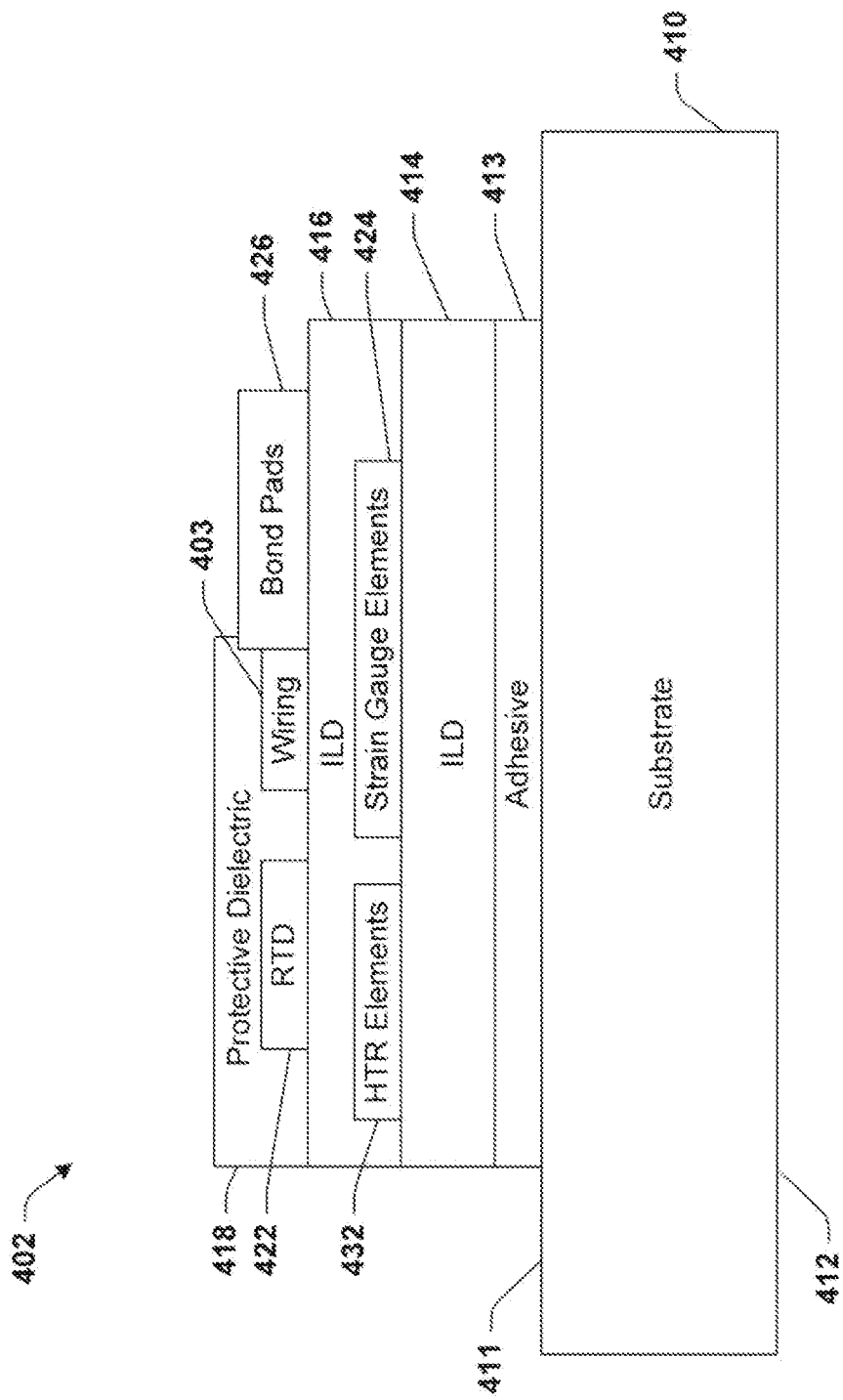
FIGS. 4F, 4G and 4H illustrate cross-sectional diagrams of exemplary sensor assemblies such as that of FIGS. 4A, 4B, 4D and 4E affixed onto the dry side of a single substrate used in accordance with one or more aspects of the present invention.
Figure 4G:
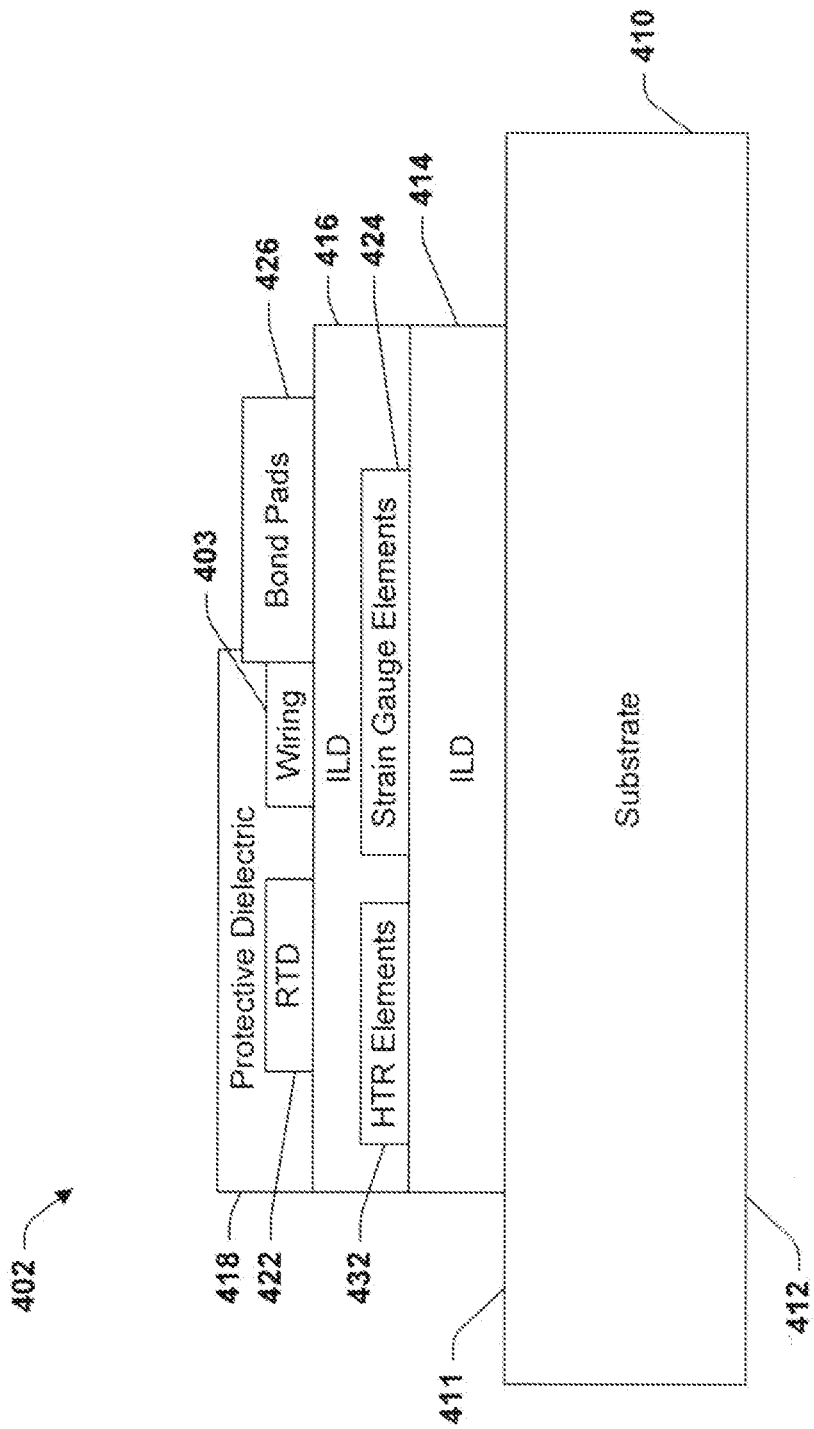
Figure 4H:
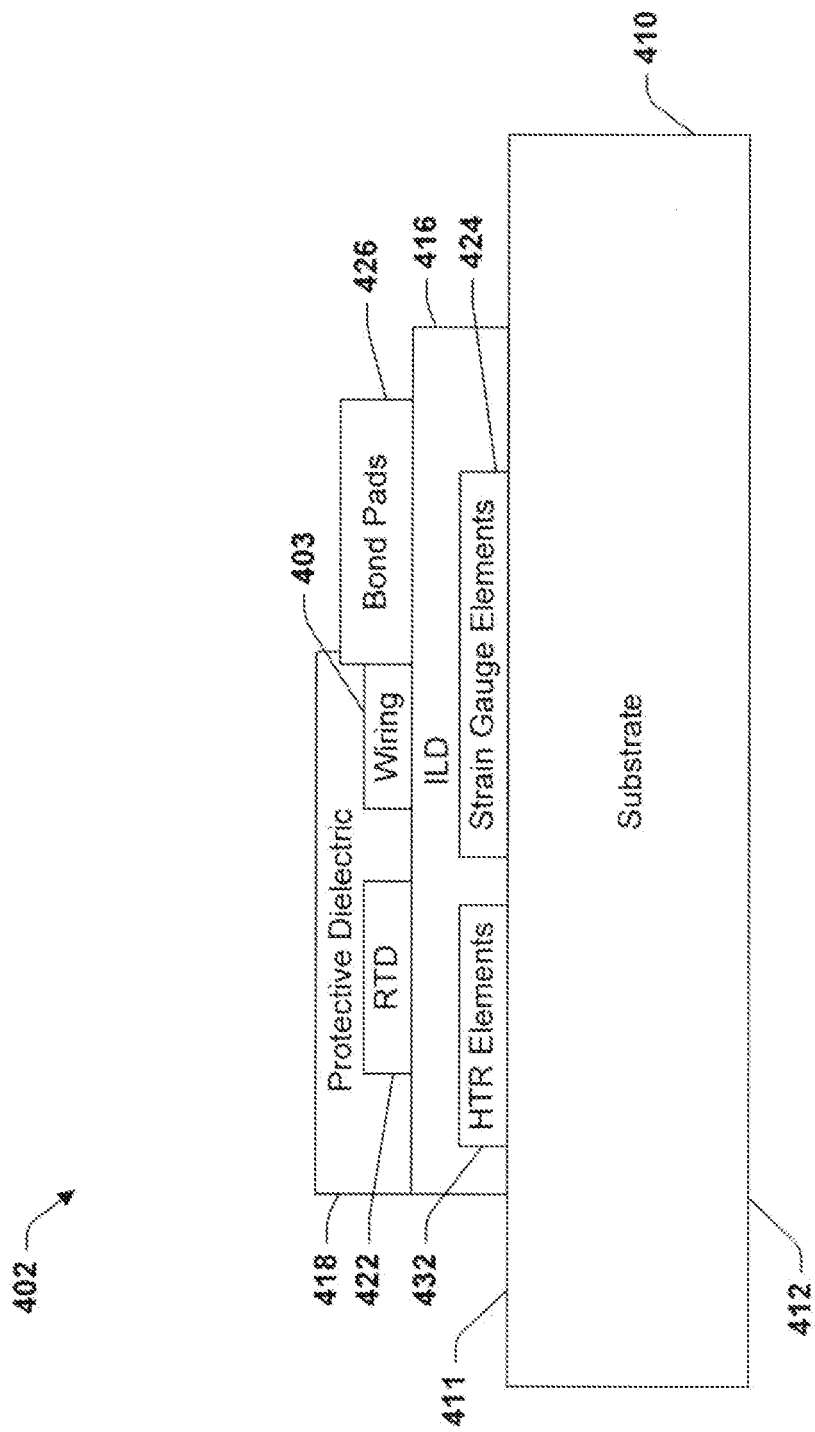

FIGS. 4F, 4G and 4H further illustrate cross-sectional diagrams of exemplary sensor assemblies 402 such as those of FIGS. 4A, 4B, 4D and 4E affixed onto the dry side 411 of a single (common) substrate 410 of the multi-sensor component 400, used in accordance with one aspect of the present invention.

FIGS. 4F, 4G and 4H also illustrate several exemplary layering techniques, wherein the temperature detector 420, the heater 430 and the pressure detector 450 may be deposited as one or more metals directly onto the dry side 411 of the substrate 410 (FIG. 4H), to a dielectric material which has been deposited onto the dry side 411 of the substrate (FIG. 4G), or to a dielectric (e.g., Kapton) material surface which is molecularly bonded or glued onto the dry side 411 of the substrate 410 (FIG. 4F).

For example, in FIGS. 4F and 4G, if the substrate 410 comprises a conductive material such as stainless steel or another such metal to separate the wet (opposing) side 412 in contact with the object or medium (e.g., 110) being sensed, from the dry (facing) side 411, a dielectric (electrically insulative material, Kapton, SiO2, Sapphire, SU2008) or first interlayer dielectric layer (ILD) 414 is affixed, deposited or spun onto the substrate 410 either directly as in FIG. 4G, or glued via a high temperature adhesive 413 to the substrate 410 as in FIG. 4F. First ILD layer 414 therefore provides electrical isolation of the sensor pattern 401 and wiring pattern 403 from the conductive substrate 410.

In one embodiment, the strain gauge elements 424 and heater elements 432 are deposited as metals (e.g., Pt, Ni or Au via vacuum vapor deposition) onto the first ILD layer 414 along with any conductive interwiring 403, and then covered with a second ILD layer 416. RTD elements 422 (e.g., Nickel) may then be applied (e.g., via vacuum vapor deposition) over the heater elements 432. Additional interwiring layers 403 may be applied together with the RTD elements 422, or separately, depending on the thickness desired, to provide adequate conductivity between the detector/heater elements and bond pads 426 which are also applied over ILD layer 416. A protective dielectric layer 418 is then applied over all the sensor pattern 401 and wiring pattern 403 elements, but leaves at least a portion of the bond pads 426 exposed for wire bonding.

In FIG. 4H, for example, if the substrate 410 comprises an insulative or otherwise non-conductive material such as a ceramic, composite, fiber reinforced composite, silicon, fiberglass, or another such generally high tensile strength, high thermal conductance material to separate the wet (opposing) side 412, from the dry (facing) side 411, a first interlayer dielectric layer (ILD) 414 may not be required for electrical isolation. However, the inventors appreciate that an RMS smoothness of less than about 15 micro-inches may still be needed for adequate subsequent depositions of the sensor pattern 401 and wiring pattern 403. The strain gauge elements 424 and heater elements 432 may again be deposited as described above as metals (e.g., via vacuum vapor deposition)

along with any conductive interwiring 403, directly onto the insulative substrate 410, and then covered with a second ILD layer 416.

Again as above, RTD elements 422 may then be applied (e.g., via vacuum vapor deposition) over the heater elements 432. Additional interwiring layers 403 may be applied together with the RTD elements 422, or separately, depending on the thickness desired, to provide adequate conductivity between the detector/heater elements and bond pads 426 which are also applied over second ILD layer 416. A protective dielectric layer 418 is then applied over all the sensor pattern 401 and wiring pattern 403 elements, but leaves at least a portion of the bond pads 426 exposed for wire bonding.

Alternately, the ordering of the layers for the heater elements 432 and the RTD's 422 may be reversed or inverted. The sensor pattern 401 and wiring pattern 403 elements may also be applied on the same layer.

Figure 4J:
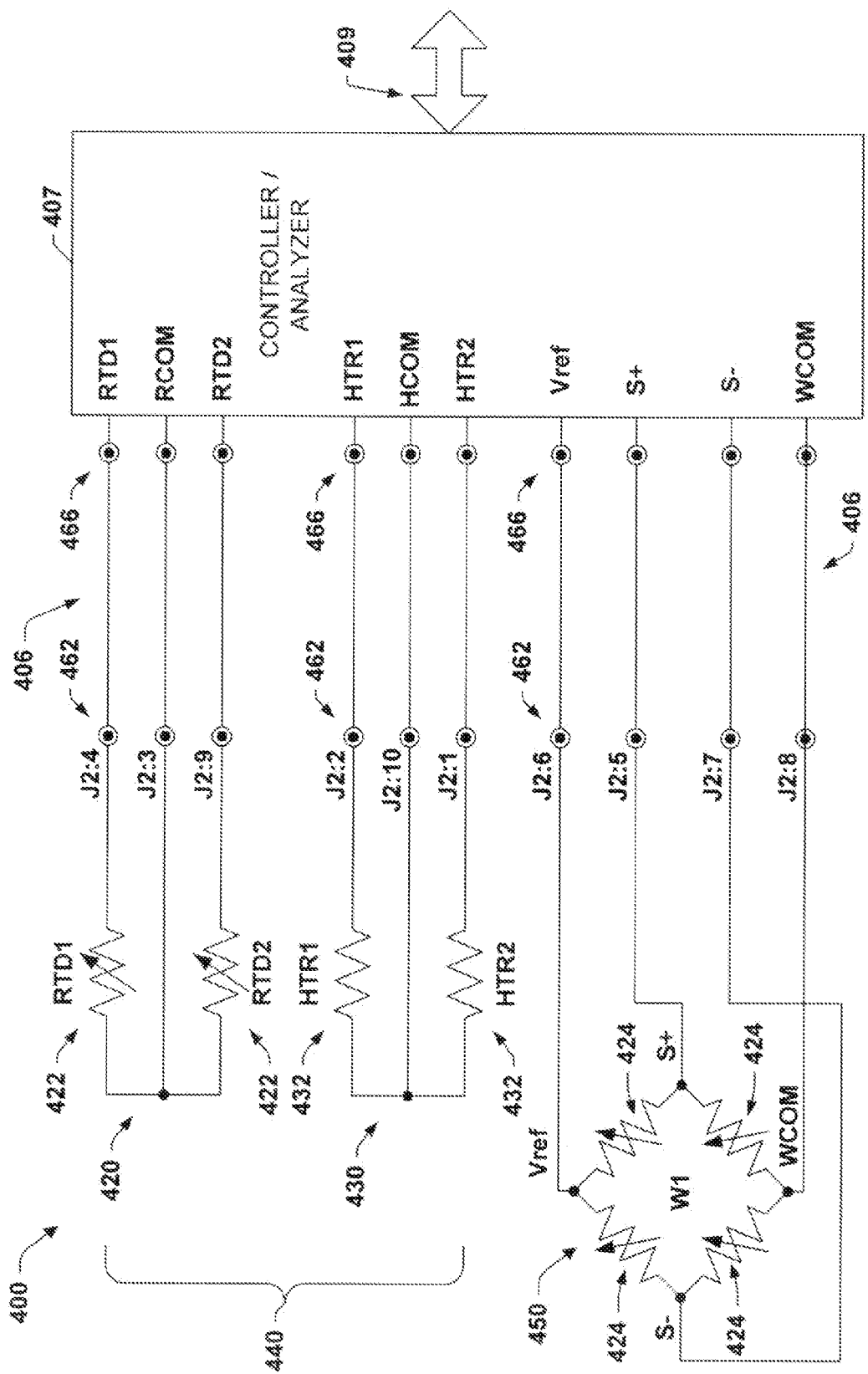
FIG. 4J illustrates a schematic diagram of the multi-sensor component of FIGS. 4A-4C used in accordance with an aspect of the present invention.

FIG. 4J illustrates a schematic diagram of the multi-sensor component 400 of FIGS. 4A-4C used in accordance with an aspect of the present invention. Multi-sensor component 400 of FIG. 4J comprises a temperature detector 420, a heater 430 and a pressure detector 450 all coupled via interconnect wiring 406 to the controller/analyzer 407 having an I/O bus 409, for example, a 2-8 wire I/O bus 409. The temperature detector 420 and the heater 430 collectively comprise a presence detector 440. The detectors and heater of the sensor assembly 402, terminate at junction terminals 462 (J2:1-10), and are coupled to terminals 466 of the controller/analyzer 407 via interconnect wiring 406.

The temperature detector 420 of multi-sensor component 400 of FIG. 4J further comprises resistive thermal detectors RTD1 and RTD2 (422) coupled together at a common node RCOM, in effect forming a three terminal temperature detector. The heater 430 of multi-sensor component 400 of FIG. 4J further comprises heater elements HTR1 and HTR2 (432) coupled together at a common node HCOM, in effect forming a three terminal heater. Pressure detector W1, 450 of multi-sensor component 400 of FIG. 4J further comprises a full-wave Wheatstone strain gauge bridge comprising four strain gauge elements 424. The Wheatstone bridge 450, for example, receives a voltage reference (Vref) and common (WCOM) voltage from the controller/analyzer 407, and in response to an induced strain produced by the pressure of the medium (or an object), outputs at bridge nodes S+ and S− a pressure signal back to the controller/analyzer 407.

The controller 407 of the multi-sensor component 400 comprises control circuitry and an algorithm, for example, provided on a PCB, configured and operable to independently monitor and compare temperature signals from temperature detectors RTD1 and RTD2 (422) in order to achieve redundant and fail safe operations, to condition the temperature signals, and to provide a conditioned temperature signal output therefrom. For example, to achieve the failsafe/redundant operations, the controller 407 may comprise an independent amplifier circuits each operable to individually monitor the resistance of the temperature detectors RTD1 and RTD2 (422). If an expected resistance from one of the temperature detectors 422 can not be achieved, the controller 407 is configured and operable to issue a temperature detector or sensor failure alarm signal and/or to subsequently rely on the remaining good temperature detector(s) for future temperature sensing operations.

The controller 407 also comprises a regulated current source and current measuring means operable to provide a measured current from the regulated current source to each of the heaters HTR1 and HTR2 (432) in order to achieve redundant and fail safe operations of the heaters 432. For example, to achieve the failsafe/redundant operations, the controller 407 is operable to individually drive heaters HTR1 and HTR2 (432) while measuring the current to each heater. If an expected current to one of the heaters 432 can not be achieved, the controller 407 is configured and operable to issue a heater or sensor failure alarm signal and/or to subsequently rely on the remaining good heater(s) for future sensor heating operations.

The controller 407 of the multi-sensor component 400 further comprises control circuitry and an algorithm, operable to supply a regulated reference signal between terminals Vref and WCOM of the Wheatstone bridge W1 of the pressure detector 450, and to amplify and measure a differential strain gauge signal associated with a pressure signal between terminals S+ and S− of the Wheatstone bridge W1 of the pressure detector 450. The controller 407 is also configured and operable to condition the pressure signal, and to provide a conditioned pressure signal output therefrom. If pressure signal indicates an overpressure condition, the controller 407 is further operable to issue an overpressure alarm signal.

The controller 407 of the multi-sensor component 400 is also configured and operable to provide the temperature, pressure and presence signals from the temperature and pressure detectors, for example, onto a bus 409 by way of a bus connector 408.

Thus, the multi-sensor component 400 may be used as a single sensing device to monitor the temperature, pressure and the presence of water in a hot water boiler system 500 as will be discussed further in association with FIG. 5 infra.

The particular arrangement of the multi-sensor component 400 of the present invention permits the temperature detector 420 to sense the surrounding temperature (object or medium), while the heater 430 provides heat to the multi-sensor component 400, thereby providing temperature regulation to an expected or predetermined temperature as measured by the temperature detector 420. Measurement using the temperature detector 420 at the expected temperature, when heated by the heater 430 and also when allowed to cool to the temperature of the medium/object, indicates the responsiveness of the temperature detector 420 and provides a level of confidence that the temperature detector 420 is working properly and providing an accurate temperature measurement. In addition, when power is removed from the heater 430, the temperature response, such as a temperature change, a rate of change or a time constant (TC) of the thermal decay rate may be computed by the controller/analyzer (e.g, 407) based on two or more temperature measurements, to indicate whether an object or medium (e.g., a heat sink, heat exchanger, water) is present surrounding the sensor, or if it is absent. For example, a high (rapid, short) TC temperature decay rate may indicate the sensor is immersed in water (indicating the medium is present), while a low (slow) TC rate may indicate the sensor is in air (indicating the medium is absent).

In a preferred implementation, the wet side 412 of the multi-sensor component 400 is mounted thru an opening in the boiler tank wall (e.g., 102, 502) to directly contact the boiler water (e.g., 110, 510), thereby inherently providing intimate thermal contact with the medium (e.g., 110, 510).

In another embodiment and mode of temperature detector redundancy, when power is removed from the heater 430, the controller/analyzer 407 is further configured and operable to measure the resistance of the heater 430 to provide a temperature detector measurement similar to that of temperature detector 420 described above. Thus, each heater element 432 of heater 430 may also be used as a combination heater 430 and temperature detector, providing further fail-safe operations and sensor redundancy benefits if needed.

In one optional mode of operations of multi-sensor component 400, a temperature detector 420 or heater 430 confidence check, for example, may be made immediately after removing the heater power supply from the heater, and before the multi-sensor component 400 has had a chance to cool significantly. However, in some medium/object situations, the temperature response (e.g., time constant TC) of multi-sensor component 400 may be too high (rapid, short) to make an accurate measurement practical after power removal. Alternately, therefore, the current and voltage going into temperature detector 420 may both be monitored and the resistance calculated during the heating phase to provide continuous temperature monitoring from the resistance calculation.

Figure 4K:
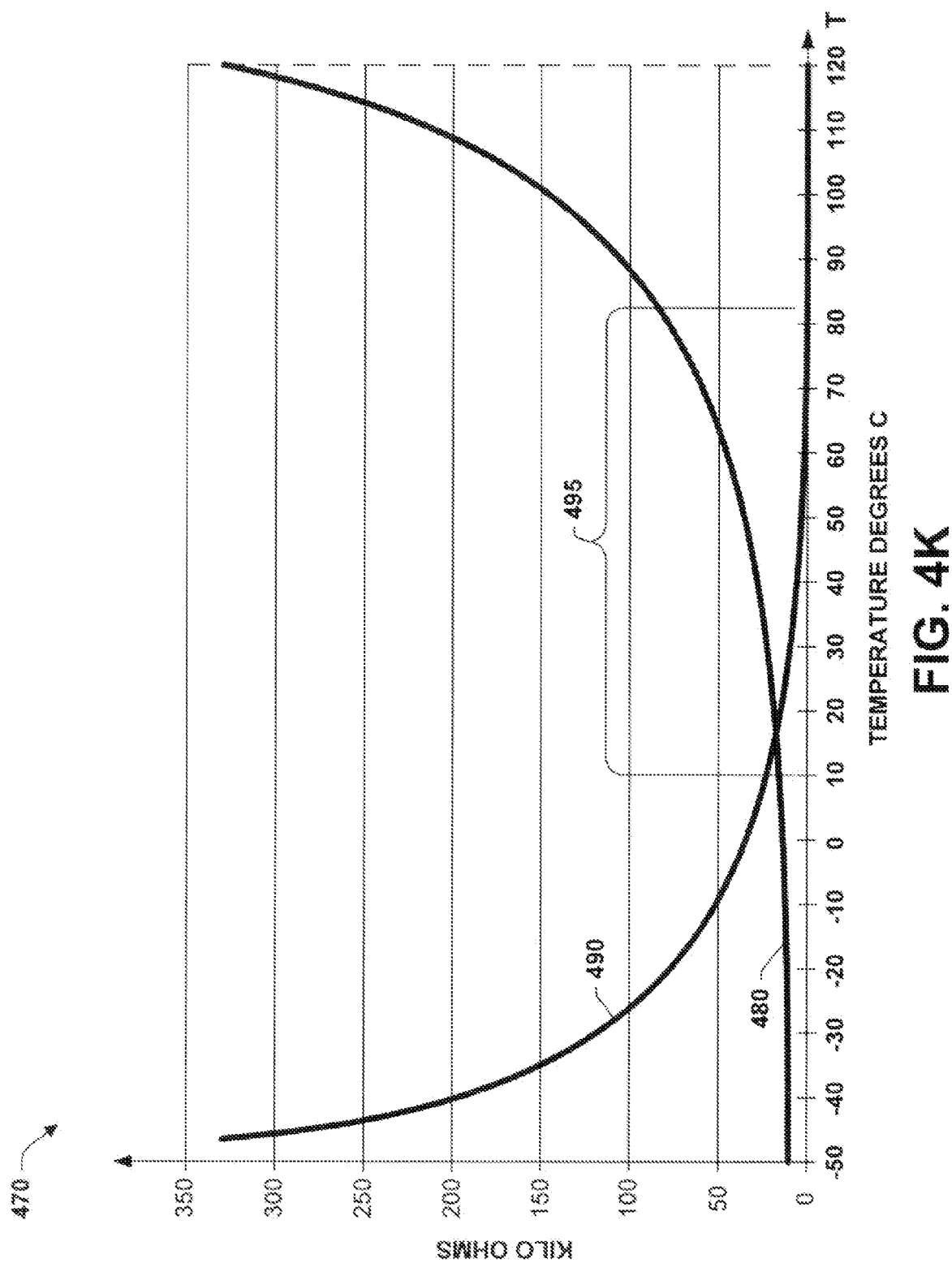
FIG. 4K is a plot of an exemplary Resistance Temperature Detector (RTD) or an NTC resistive element exhibiting a decreasing change in resistance as the temperature increases such as may be used in an NTC temperature sensor, such as may be used together with and heated by a resistive heating element, and a PTC resistive element exhibiting an increasing change in resistance as the temperature increases, respectively, in accordance with one or more aspects of the present invention.

FIG. 4K illustrates a plot 470 of an exemplary Resistance Temperature Detector (RTD) comprising an negative temperature coefficient (NTC) resistive element 490 exhibiting a decreasing change in resistance as the temperature (T) increases such as may be used in an NTC type temperature detector 420, and such as may be used together with and heated by a resistive heating element 432, in accordance with one or more aspects of the present invention. FIG. 4K further illustrates a positive temperature coefficient (PTC) resistive element 480 exhibiting an increasing change in resistance as the temperature increases such as may be used in a PTC type temperature detector 420, in accordance with another aspect of the present invention. Either an NTC or a PTC type RTD may be utilized in the present invention, however, the better Platinum RTD's are generally of the NTC variety.

A typical operating range 495 for a hot water boiler system is also illustrated ranging from about 10° C. to about 82° C. (about 50-180° F.).

Figure 5:
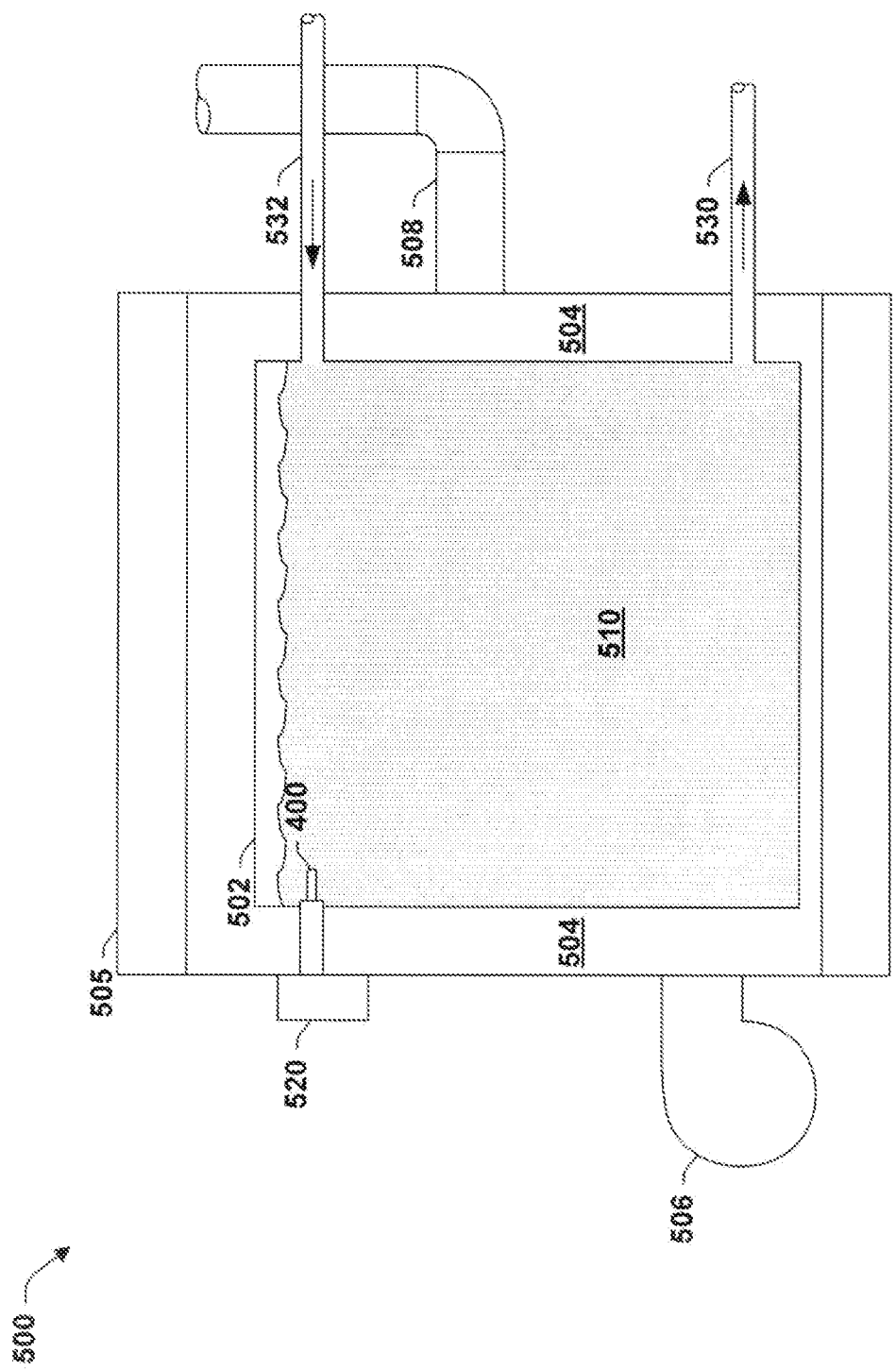
FIG. 5 is a simplified diagram of an exemplary hot water boiler system using a single multi-sensor component for measuring a temperature and pressure of the water and for detecting the presence of the water in the boiler, the functions provided together in a single fail-safe multi-sensor component.

FIG. 5 illustrates an exemplary hot water boiler system 500, utilizing a single fail-safe multi-sensor component similar to that of 400 of FIGS. 4A-4J, for measuring a temperature and pressure, and detecting the presence of the water in the boiler 500 in a fail-safe manner in accordance with the present invention. Other such HVAC systems may also incorporate the fail-safe multi-sensor component 400 of the present invention to help regulate the temperature and level of a medium (e.g., water, Freon, ammonia, or alcohol) used in the HVAC system.

The exemplary boiler 500 of FIG. 5 comprises a boiler tank 502 surrounded by an insulating material layer 504 within a boiler enclosure 505. A burner 506, having a flue vent 508, heats water 510 within the tank 502 to a temperature set by a temperature, pressure and presence sensing control/display device 520. The temperature, pressure and presence sensing control/display device 520 comprises a fail-safe multi-sensor component 400, having a temperature detector 420 that changes in resistance when heated to actuate a high/low limit temperature monitoring circuit or another such analyzer (not shown) for control of the system about a temperature set point. The heated water 510 is circulated through a feed water line 530 to an external heat exchanger (not shown) and the cooled water returns to the boiler through a supply/return line 532. If the level of the water 510 within the boiler tank 502 drops below the level of the multi-sensor component 400, the burner 506 may be shut-down by the temperature, pressure and presence sensing control/display device 520 until additional water 510 is added to the boiler 500 to maintain safe operation and avoid boiler damage.

The multi-sensor component 400 of the temperature, pressure and presence sensing control/display device 520 also has a heater 430 that is used to cyclically heat and cool the multi-sensor component 400. As the multi-sensor component 400 cools in each thermal cycle, the change in temperature is monitored by the controller/analyzer 407 using the change in resistance of the temperature detector 420. From the temperature measurements, the controller/analyzer 407 then computes the temperature response such as a temperature change, a rate of change or a thermal decay rate time constant (TC) of the multi-sensor component 400, to determine whether water 510 is present surrounding the multi-sensor component 400. If water 510 is not present at the multi-sensor component 400 (indicating a low water condition), the burner 506 is shut-down until additional water 510 is added, thereby maintaining fail-safe operation of the boiler system 500. Further, the health of the multi-sensor component 400 may also be ascertained by using the temperature detector 420 to monitor the heater 430 within the multi-sensor component 400, after thermal equilibrium is established at the expected regulation temperature. Thus, in accordance with several aspects of the present invention, the fail-safe multi-sensor component 400 may be used to detect the temperature and presence of a medium in an HVAC system in a fail-safe manner.

In another implementation of the present invention, the temperature and presence of a heat exchanger (not shown) may be detected using the multi-sensor component 400 of the present invention. As a heat exchanger (e.g., comprising a high thermal conductivity metal with fins) is likely to produce a higher thermal decay rate than that of water or another such medium, the temperature swing produced by the heater 430 of the multi-sensor component 400, is also likely to be low. Thus, the regulation temperature of the heater 430 may be shifted to a significantly lower temperature level when used in the determination of health of the temperature detector 420. Further, the presence detection algorithm as it may be applied to a heat exchanger application may be somewhat limited to determining whether there is adequate thermal union between the multi-sensor component 400 and the heat exchanger. For example, if the multi-sensor component 400 has slipped out of contact with the heat exchanger, the thermal TC would be greatly reduced and a presence determination therefore would indicate that the medium (e.g., the heat exchanger) is not present.

Figure 6:
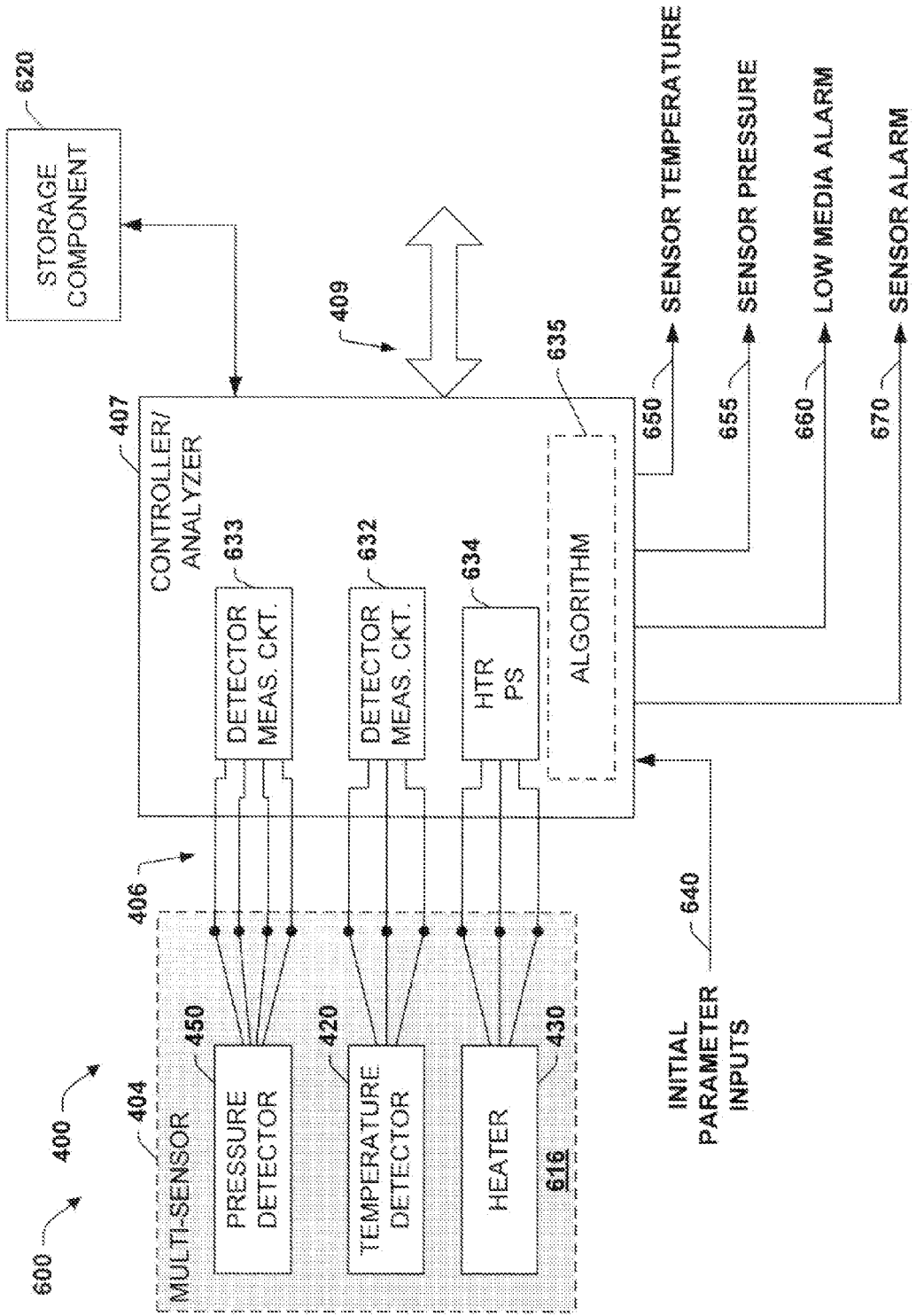
FIG. 6 is a simplified block diagram of an equivalent circuit of an exemplary multi-sensor component of the present invention of FIGS. 4A-4C for monitoring the temperature, pressure and presence of an object or medium, and for detecting sensor degradations and predicting failures in accordance with an aspect of the present invention.

FIG. 6 illustrates further details of an exemplary temperature, pressure and presence sensing system 600 using the multi-sensor component 400 of FIGS. 4A-4C for measuring temperature, pressure and for detecting the presence of a medium/object and for detecting sensor degradations and predicting failures in accordance with an aspect of the present invention.

Figure 7:
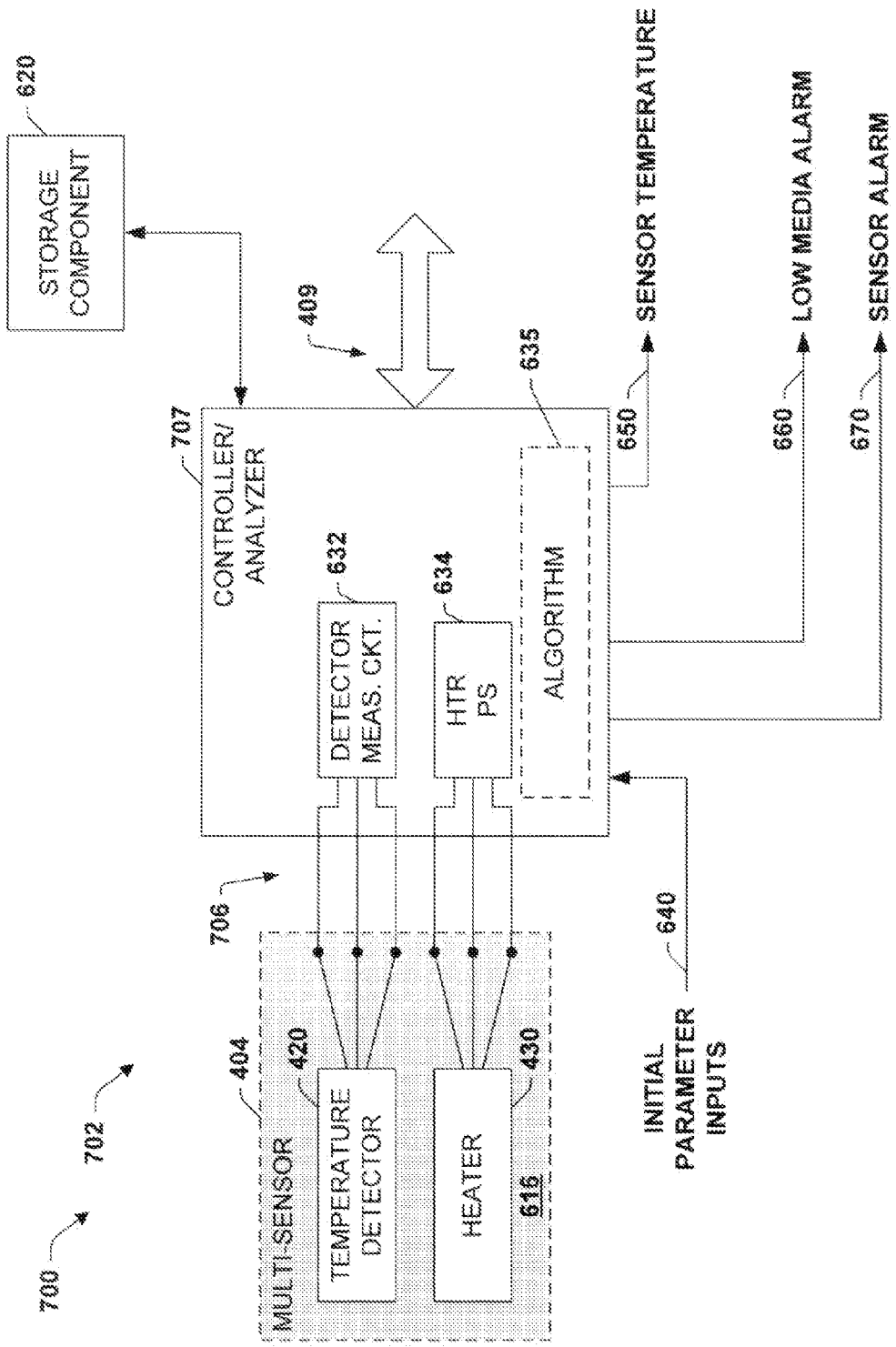
FIG. 7 is a simplified block diagram of an equivalent circuit of an exemplary multi-sensor component of the present invention of FIGS. 4A-4C for monitoring the temperature and presence of an object or medium, and for detecting sensor degradations and predicting failures in accordance with another aspect of the present invention.

Similarly, FIG. 7 illustrates details of an exemplary temperature and presence sensing system 700 using a multi-sensor component 702 which is similar to the multi-sensor component 400, but has no pressure detector 450, multi-sensor component 702 used for measuring a temperature and for detecting the presence of a medium/object and for detecting sensor degradations and predicting failures in accordance with an aspect of the present invention.

Both sensor 400 of system 600 of FIG. 6, and sensor 702 of system 700 of FIG. 7, respectively, comprise a temperature detector 420 and a heater 430, however, only sensor 400 of system 600 comprises a pressure detector 450. In one embodiment, the sensors 400/702 of FIGS. 6 and 7, respectively, further comprise the temperature detector 420 and/or the pressure detector 450, and the heater 430 affixed together within a casting or potting material 616 (e.g., silicon rubber, thermal epoxy, or ceramic material) to provide a close thermal union between the two elements. In another embodiment, the temperature detector 420 and/or the pressure detector 450, and the heater 430 may be, for example, affixed, bonded, deposited, or glued together onto the dry side 411 of a substrate such as substrate 410 of FIGS. 4A, 4B, 4D-4H.

The controller/analyzer 407 of FIG. 6, and controller/analyzer 707 of FIG. 7 is operable to monitor the resistance measurements of the temperature detector 420 or the heater 430, respectively, and provide associated temperatures. Controller/analyzer 407 of FIG. 6 is also operable to measure a differential strain gauge based pressure signal from the pressure detector 450 and provide a pressure of the medium/object. As system 700 of FIG. 7 does not use a pressure detector 450, the interwiring 706 between the multi-sensor component 702 and the controller/analyzer 707 may have fewer wires. Then, using the resistance measurements or the temperatures, the analyzer is further operable to compute the temperature response, for example, a thermal decay rate time constant (TC) of the sensor 400/702 to determine whether a medium or object is present at the sensor 400/702. Further, the health of the sensor 400/702 may also be ascertained with the assistance of the controller/analyzer 407/707 (e.g., microprocessor, PIC, microcomputer, computer, PLC), by monitoring the temperature detector 420 or the heater 430, and comparing the temperature indicated to the temperature of the heater 430 after thermal equilibrium is established at the expected regulation temperature.

For example, system 600 of FIG. 6 and 700 of FIG. 7 both comprise a fail-safe sensor 400 or 702, respectively, connected to a controller/analyzer 407/707 (e.g., microprocessor, PIC, microcomputer, computer, PLC). The controller/analyzer 407/707 is further operably coupled to a storage component 620 (e.g., memory) for storage of initial input parameters 640 (e.g., initial resistance of the detector at a certain temperature, expected regulation temperature, low medium alarm levels or acceptable TC levels for the presence of a object or medium, acceptable sensor degradation % levels, etc.). Controller/analyzer 407/707 further comprises a detector measurement circuit 632 for monitoring the temperature of the temperature detector 420 of system 700 or the heater 430 (acting as the temperature detector) of system 700. Controller/analyzer 407 also comprises a detector measurement circuit 633 for monitoring the pressure of the pressure detector 450 of multi-sensor component 400. Controller/analyzer 407/707 also includes a controllable heater power supply 634 (e.g., 5 VDC, 120 VAC) to supply a voltage or current to the heater 430 (e.g., resistance wire, thermistor, integrated circuit heater) for heating the sensor 400/702 to an expected temperature.

Controller/analyzer 407/707 further comprises an algorithm 635 (e.g., a program, a computer readable media, a hardware state machine) that is applied to the respective system to calculate and analyze the temperature monitoring, pressure, presence detection, and/or sensor degradation and failure prediction. Upon completion of such calculations and/or analysis, the algorithm 635 provides several possible output results from the controller/analyzer 407/707 that may include a present sensor temperature 650 (e.g., 180° F.), a sensor pressure/sensor overpressure 655 (e.g., 200 PSI), and if a predetermined limit has been achieved, a low medium alarm 660 (e.g., low water cut-off level, medium absent), and/or a sensor alarm 670 (e.g., sensor or system failure imminent, sensor maintenance required) may be issued. In addition, controller/analyzer 407/707 is also configured and operable to communicate with an input/output bus 409 such as a 4-wire digital bus to supply the above outputs and/or to receive the initial parameter inputs 640.

Alternately, and as indicated previously, in addition to the temperature detector 420 measurements, the current and voltage going into the heaters 430 of multi-sensor component 400/702 may be monitored and the resistance calculated during the heating phase to provide continuous temperature monitoring based on the resistance calculation.

In another embodiment of the present invention, the multi-sensor component 400/702 may comprise an integrated circuit heater and/or detector further operable, for example, to digitally communicate to the controller/analyzer 407/707 a temperature signal, a pressure, a sensor parametric input, a sensor model, a sensor serial number, a manufacturing date, and a calibration temperature, for example.

Figure 8:
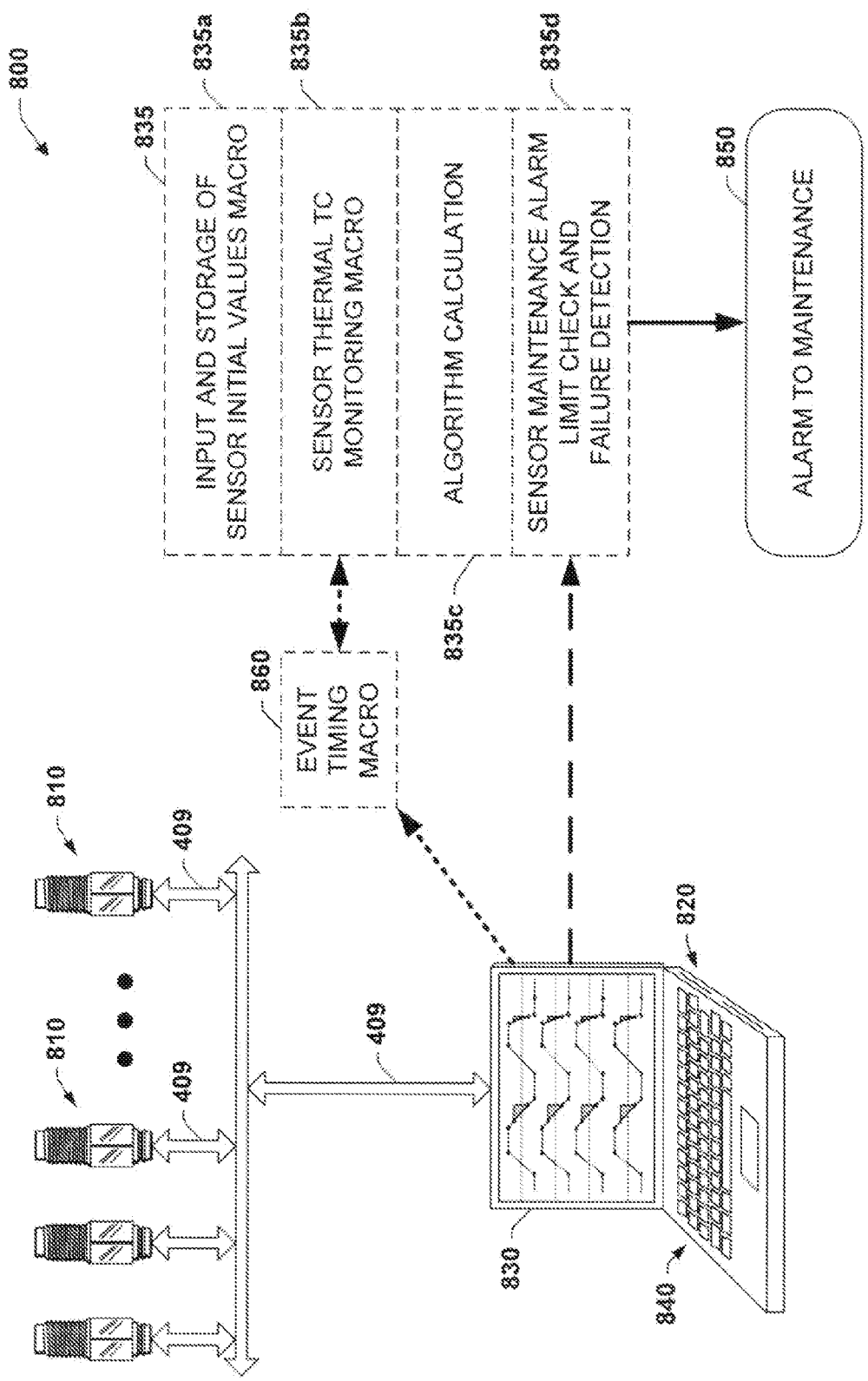
FIG. 8 is a functional diagram of an exemplary multi-sensor component monitoring system and illustrating a method for monitoring, analyzing, and detecting sensor temperature, medium pressure and presence, and predicting sensor or system failures in accordance with an aspect of the present invention.

FIG. 8 illustrates an exemplary fail-safe sensor monitoring system 800 similar to those of FIGS. 6 and 7, such as may be used in a larger scale HVAC system having, for example, one or more multi-sensor components and/or boilers. The fail-safe sensor monitoring system 800 illustrates a method for monitoring, analyzing, and detecting sensor temperature, pressure, medium presence, and detecting sensor failures in accordance with an aspect of the present invention.

The present invention provides one such method and system for monitoring one or more multi-sensor components and detecting present or impending sensor or HVAC system failures automatically and without disrupting service. An object or medium detection portion of the algorithm of the present invention utilizes a change in the cool-down temperature response (e.g., a temperature change, a rate of change and time constant) that exceeds a predetermined level based on the sensor temperature measurements in order to detect the presence (or absence) of an object or medium surrounding the sensor. A failure detection portion of the algorithm of the present invention, for example, utilizes a change over time in the warm-up and/or cool-down temperature responses of the sensor temperature measurements to detect an impending multi-sensor component or HVAC system failure. In addition, no change or an extreme change in the warm-up and/or cool-down TC of the sensor temperature measurements may indicate a present sensor or HVAC system failure.

For example, FIG. 8 illustrates one example of a fail-safe sensor monitoring system 800 for monitoring, analyzing, and detecting sensor temperature, pressure, medium presence, and predicting sensor or system failures in accordance with an aspect of the present invention. The detection system 800 comprises a plurality of two or more multi-sensor components 810 (e.g., 400, 702), a storage component 820, and an analyzer 830 having an alarm and failure detection algorithm 835 used by the analyzer 830 for calculating sensor temperature responses, for example, comprising a temperature change, a rate of change and a thermal time constant TC and detecting changes in the sensor measurements associated with sensor degradations to make multi-sensor component or system failure predictions. The plurality of multi-sensor components 810 are individually operable to monitor and measure a temperature and/or pressure and forward the results by way of a bus 409 (e.g., a digital four-wire bus) coupled to the analyzer 830. The analyzer 830 is operable to receive one or more sensor parametric inputs 840 (e.g., provided by the manufacturer, or otherwise predetermined) and the results of the temperature and pressure measuring component 810.

The analyzer 830 of FIG. 8 is further operable to analyze the results of the plurality of multi-sensor components 810, and use the alarm and failure detection algorithm 835 together with the sensor parametric inputs 840 to compute and store the computed, predetermined, acceptable thermal TC levels, and other input parameters to the storage component 820. The analyzer 830 of the detection system 800 is further operable to direct the plurality of multi-sensor components 810 to make additional resistance, current and voltage measurements within each sensor (e.g., 400, 702) and to analyze and determine using the alarm and failure detection algorithm 835, a limit check for a sensor maintenance alarm 835d. The analyzer 830 is also operable to make a failure prediction 835d of the sensor or system 800, and issue an alarm condition to maintenance 850 if a predetermined acceptable limit has been achieved or exceeded. For example, when a predetermined failure level is reached, maintenance may be alerted to check or replace one or more of the plurality of multi-sensor components 810, to check for contaminate build-up on the sensor, or alternatively to check for loose terminal connections or broken bus 409 wires.

In another aspect of the present invention, an event timing macro 860 may be further added to control how often the sensor thermal TC measurement is made via a sensor thermal TC monitoring macro 835b. For example, timings ranging from continuous thermal TC measurements to once per day, or once per thermal process cycle may be enabled with the event timing macro 860. Similarly, pressure measurements and pressure detector trends may be monitored, timed and recorded.

Another aspect of the invention provides a methodology for monitoring, analyzing, and detecting the temperature, pressure and presence of a object or medium in a multi-sensor component or a sensor monitoring system as illustrated and described herein, as well as other types of temperature and pressure monitoring systems.

The method relies on a change that exceeds a predetermined level in the cool-down thermal TC as an indicator of the presence or absence of an object or medium surrounding the sensor and of the sensor health. For example, after measurements and calculations, a high slope thermal TC indicates the presence of a medium (or object) at the sensor, while a low slope thermal TC indicates the absence of the same medium (or object). However, if no slope or an extremely high slope is detected, a sensor or system failure is likely to be indicated. Optionally, a slope that increases or decreases over time is an indicator of, for example, a sensor or system degradation or an impending failure. The method of the present invention utilizes an algorithm to detect sensor temperature and pressure measurements, medium presence, and sensor or system degradations to enable failure predictions as described above.

Figure 9A:
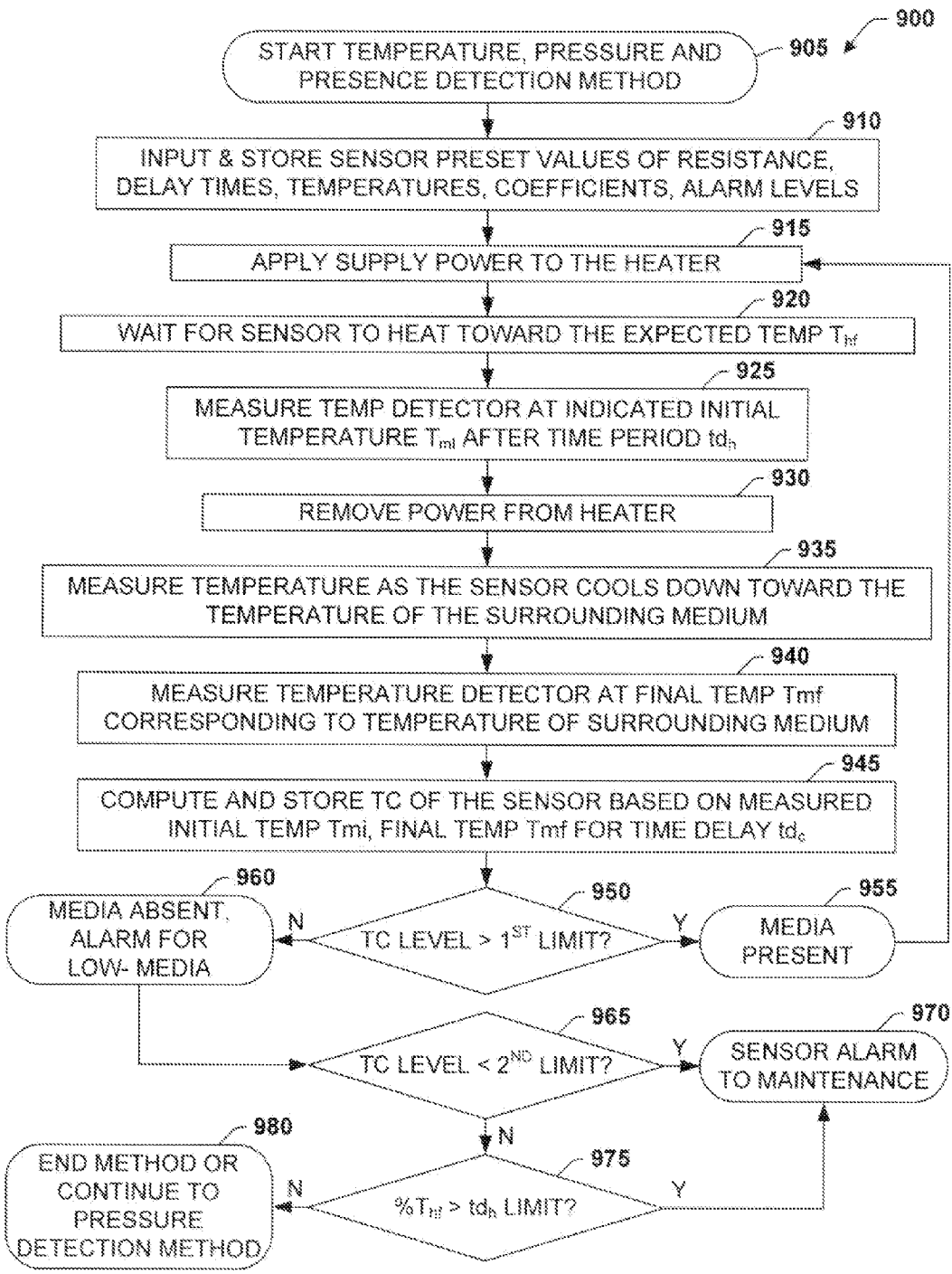
FIGS. 9A, 9B and 9C are flow chart diagrams illustrating methods of detecting a temperature, pressure and presence of an object or medium, and predicting failures in a multi-sensor component monitoring system in a fail-safe manner in accordance with one or more aspects of the present invention.

Referring now to FIG. 9A, an exemplary method 900 is illustrated for monitoring, analyzing, and detecting sensor temperature and pressure, medium presence, and sensor failures, for example, in a fail-safe temperature, pressure and presence detection system similar to the systems of FIGS. 6, 7 and 8, in accordance with an aspect of the present invention. Method 900 may also be better understood in association with the thermal plot 1000a, and logic timing diagrams 1030 and 1050 of FIG. 10. While the method 900 and other methods herein are illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the method 900 according to the present invention may be implemented in association with the temperature, pressure and presence detection systems, elements, and devices illustrated and described herein as well as in association with other systems, elements, and devices not illustrated.

The exemplary fail-safe temperature and presence detection method 900 of FIG. 9A begins at 905. Initially (e.g., upon installation) at 910, method 900 comprises inputting and storing specific parameters 640 (e.g., the initial resistance $R_{m0}$ of the temperature detector 420 from the sensor manufacturer, or as predetermined acceptable TC levels) of the fail-safe multi-sensor component 400/702 (e.g., RTD1, RTD2). Other parameters 640 input at 910 may also include the expected regulation temperature $T_{hf}$ of the heater 430, a TC $1^{st}$ level associated with the presence/absence of a medium, a TC $2^{nd}$ level associated with a sensor alarm level for maintenance, and a maximum allowable delay time $td_h$. The input parameters are stored in memory (e.g., 620) for future use and/or reference. At 915, a current from a power supply (e.g., 634) is applied to the heater 430 to begin heating the sensor 400/702.

After waiting for a period of time, such as the delay time $td_h$, at 920, the sensor will have heated to about the expected temperature $T_{hf}$ of the sensor 440/702. At 925, for example, after the delay time $td_h$, the temperature detector 420 is then measured at an initial temperature $T_{mi}$. Accordingly, after an appropriate warm-up period, the measured initial temperature $T_{mi}$ indicated by the temperature detector 420 of a healthy sensor will approximate the expected temperature $T_{hf}$, or $T_{mi} \sim T_{hf}$. Current from the power supply (e.g., 634) is then removed from the heater 430 at 930. As the sensor 400/702 cools down toward the temperature of the surrounding medium (e.g., water, Ammonia, Freon) at 935, the sensor temperature detector 420 is monitored and measurements are taken. Optionally, the initial temperature $T_{mi}$ may be updated again or continuously updated just prior to the thermal cool-down slope measurements, to obtain a fully stabilized measurement $T_{mi}$ of the expected temperature $T_{hf}$.

When the temperature stabilizes, at 940, the temperature detector 420 is measured at a final temperature $T_{mf}$, corresponding to the temperature of the surrounding medium (e.g., water, Freon). A thermal cool-down TC slope (slope 1) is then computed and stored at 945 based on the initial temperature $T_{mi}$, the final temperature $T_{mf}$, and elapsed time period $td_c$ between the temperature readings.

The computed TC slope level, slope 1 is then compared to the TC $1^{st}$ level associated with the presence/absence of a medium at 950. If it is determined at 950 that the measured TC level, slope 1 is greater than the TC $1^{st}$ level, indicating that the medium is present at the sensor (e.g., the sensor is immersed in water), then the medium is present at 955 and the algorithm and thermal cycling continues to 915, wherein the heater 430 is again heated for another temperature and presence detection. If, however, at 950 the measured TC level, slope 1 is not greater than the TC $1^{st}$ level, then it is determined that the medium is absent from the sensor, and a low-media alarm is output at 960 (e.g., the sensor is in air, alarm for low water cut-off), and the algorithm continues to 965.

At 965, the computed TC slope level, slope 1 is then compared to the TC $2^{nd}$ level associated with a sensor low level alarm for maintenance. If it is determined at 965 that the measured TC level, slope 1 is less than the TC $2^{nd}$ level, then an unacceptable sensor TC slope minimum level is indicated and the algorithm outputs a sensor alarm to maintenance at 970. If, however, the measured TC level, slope 1 is not less than the TC $2^{nd}$ level, then the sensor is checked further at 975. For example, if a crack or another defect forms in the sensor assembly 402 dielectric layers between the heater 430 and temperature detector 420, or if the sensor otherwise fails, then the calculated slope may become lower than the acceptable minimum slope level.

At 975, a comparison is made to determine if the sensor (as indicated by the initial temperature measurement $T_{mi}$) was able to heat to within a predetermined percentage of the expected temperature $T_{hf}$ within the delay time $td_h$. This comparison indicates the ability of the heater 430 to heat properly to the expected temperature, as well as the ability of the temperature detector 420 to accurately report the temperature of the heater 430. If the predetermined percentage of the expected temperature $T_{hf}$ is not achieved within the time delay limit $td_h$, then the algorithm outputs a sensor alarm to maintenance at 970. Otherwise, if the predetermined percentage of the expected temperature $T_{hf}$ is successfully achieved by the initial temperature measurement $T_{mi}$ within the time delay limit $td_h$, then the algorithm of method 900 may end at 980, and another heating and cooling thermal cycle of the method may begin again, for example, at 915, or method 900 may continue to the pressure detection portion of method 900 at 982 of FIG. 9C.

Alternately, at steps 935 and 940 of method 900, as the sensor cools own toward the temperature of the surrounding medium, the temperature detector 420 is monitored and measurements are taken after the initial temperature $T_{mi}$ and before the final temperature $T_{mf}$, wherein such intermediate temperature measurements may be used to compute a thermal cool-down TC slope (slope 1) at 945.

Figure 9B:
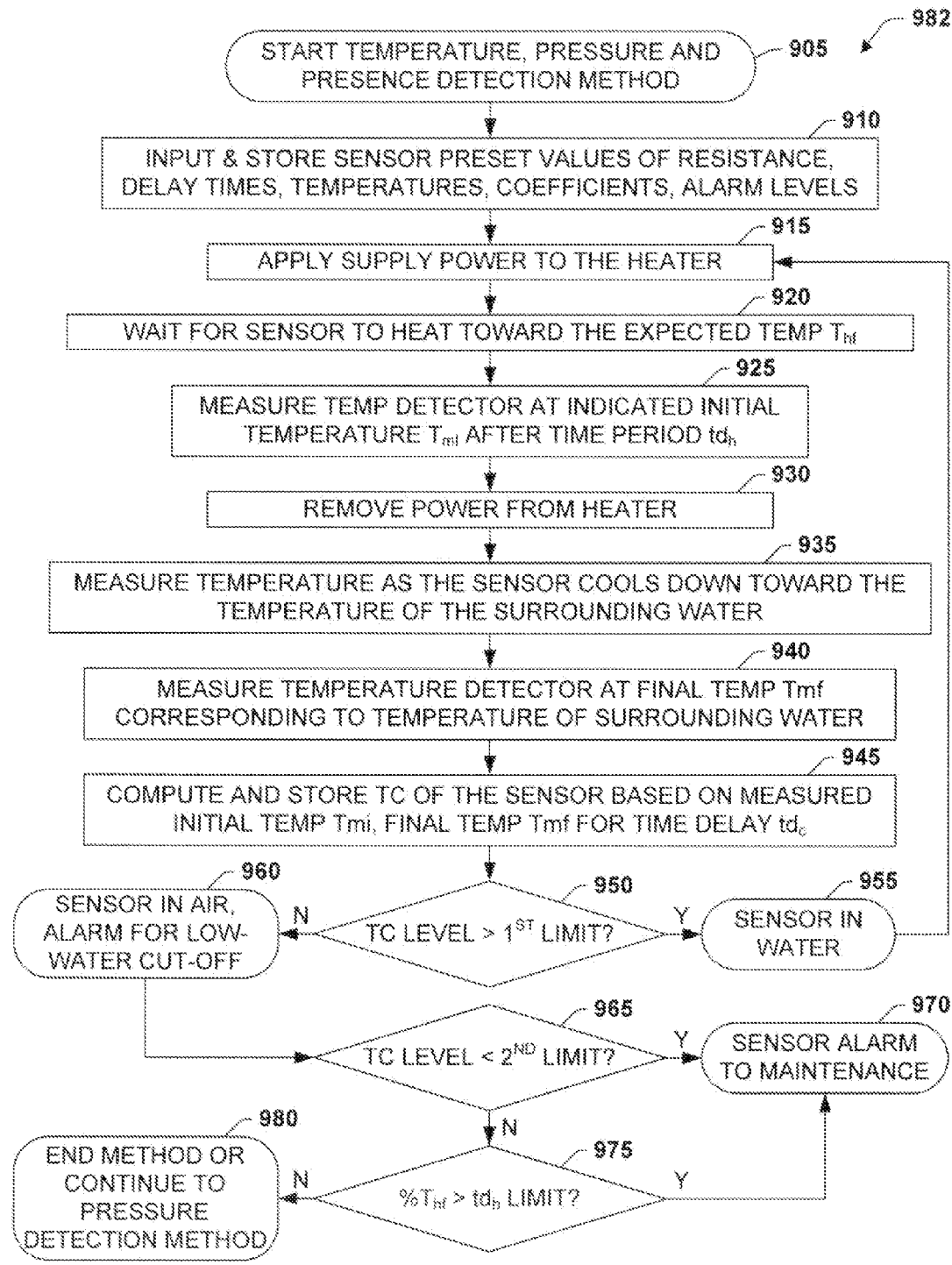

Similarly, the method 982 of FIG. 9B illustrates when water is used as the medium such as in a boiler similar to that of FIG. 5, wherein the TC levels are specifically predetermined to distinguish between a sensor immersed in water (media presence) and a sensor in air above the water (media absent).

In another aspect of the present invention of methods 900 and 982, a time-series history of the initial and final temperatures and/or the calculated thermal TC slopes may be recorded in the storage component 620 or 820 for later use. The recorded values may then be used in a trend analysis to anticipate future values based on an acceptable level of sensor or system degradation over time in order to make a failure prediction, or to signal that a failure is imminent.

Figure 9C:
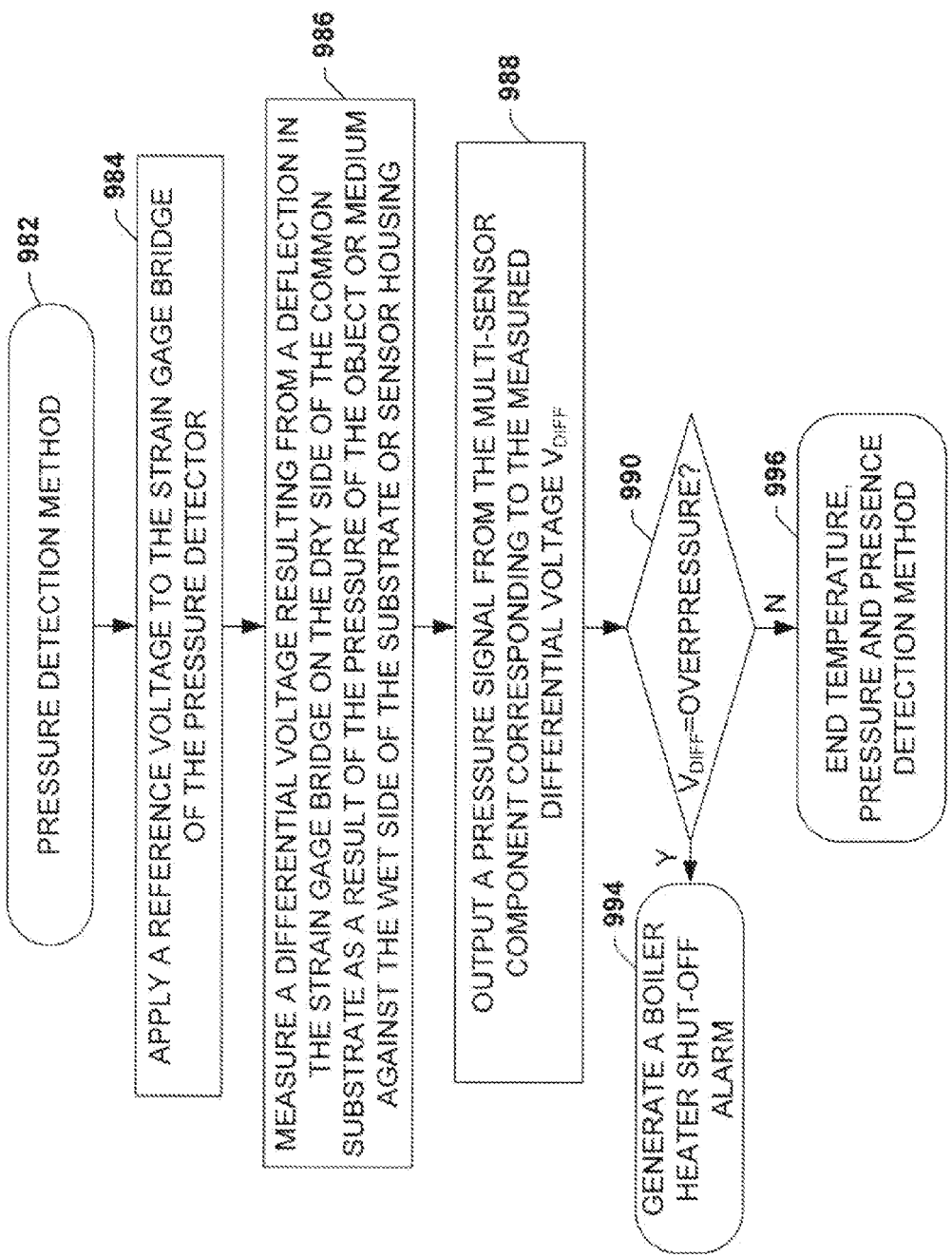

FIG. 9C illustrates the pressure detection portion of method 900 for monitoring, analyzing, and detecting the pressure of the medium and generating a boiler heater shut-off alarm, for example, in the fail-safe temperature, pressure and presence detection system similar to the systems of FIGS. 6, 7 and 8, in accordance with another aspect of the present invention.

Referencing the schematic diagram of FIG. 4J, the pressure detection portion of method 900 continues at 982, wherein at 984 of FIG. 9C, a reference voltage from controller/analyzer 407 is applied between terminals Vref and WCOM of the Wheatstone bridge W1 for the pressure detector 450.

At 984, when the medium (e.g., 510) or an object exerts a pressure on the wet side 412 of the substrate 410, the strain gauge elements 424 attached to the dry side 411 of the substrate 410 flex in response to the exerted medium pressure and produces associated resistance changes to the Wheatstone strain gauge bridge W1. In response to the resistance changes in the bridge W1 and the applied reference voltage Vref, the bridge W1 produces a corresponding differential voltage between terminals S+ and S−, which is detected and amplified by the controller/analyzer 407 and output at 988 as a pressure signal (e.g., 655 and/or on bus 409) from the multi-sensor component 400 corresponding to the differential voltage $V_{DIFF}$ from bridge W1 of the pressure detector 450.

At 990, the differential voltage $V_{DIFF}$ from bridge W1 of the pressure detector 450 is then also compared to an overpressure level associated with a maximum safe operating pressure of the boiler 500. If it is determined at 990 that the measured differential voltage $V_{DIFF}$ is greater than the maximum safe operating pressure (an overpressure), then a boiler heater shut-off alarm is generated at 994 and the boiler heater may be shut-down to avoid boiler damage and to avoid the pressure relief valve from dumping water onto the floor of the boiler room. If however, at 990 the measured differential voltage $V_{DIFF}$ is not greater than the maximum safe operating pressure (an overpressure), then the temperature, pressure and presence detection method 900 ends at 996.

Figure 10:
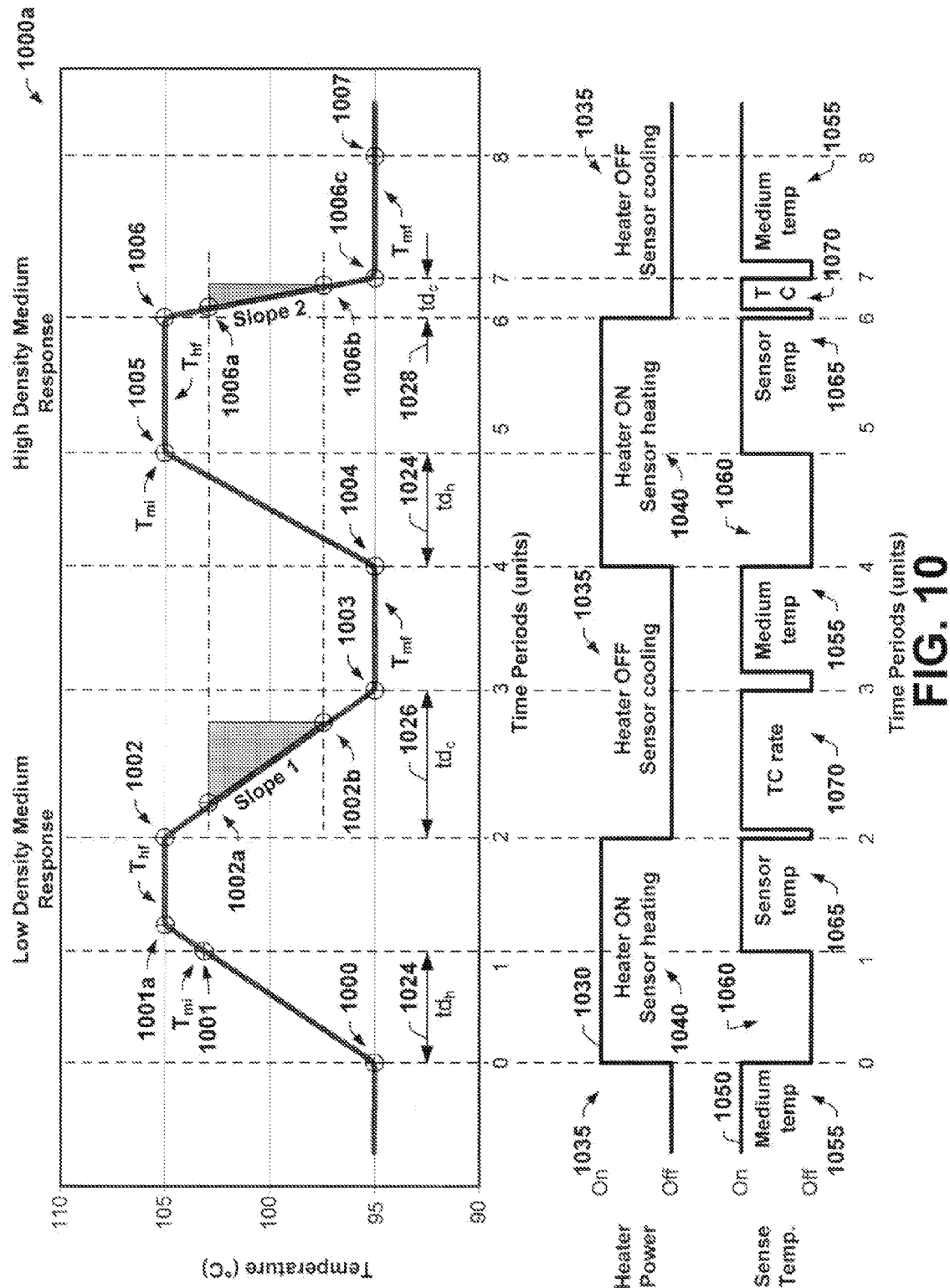
FIG. 10 is a simplified plot of the changes in temperature of the exemplary multi-sensor component monitoring systems of FIGS. 6, 7 and 8, a timing diagram plot of the heater on-times, and the temperature detection timing for measuring the medium temperature, the sensor regulation temperature, and the temperature decay rate time constant (TC) used to determine the absence or presence of a object or medium at the multi-sensor component as computed by the algorithms of FIGS. 9A, 9B and 9C in accordance with the present invention.

FIG. 10 illustrates a simplified plot 1000a of the changes in temperature of the exemplary fail-safe temperature/presence monitoring systems of FIGS. 6A, 6B, 7A, 7B, and 8. Plot 1000a of FIG. 10, also illustrates the heating and cooling cycles produced by the sensor heater 430 and the resulting temperature decay rates (slope 1 and slope 2) produced as a result of the absence or presence of a object or medium (e.g., water, 510) at the sensor (e.g., multi-sensor component 400/702) using the algorithms and methods 900 and 982 of FIGS. 9A and 9B, respectively in accordance with the present invention.

FIG. 10 further illustrates a timing diagram plot 1030 of the heater 430 on-times required to produce the sensor heating and cooling cycles of plot 1000a, and an associated plot 1050 of the temperature detector 420 timing for measuring the various sensor temperatures. The sensor temperatures include a medium temperature, a sensor regulation temperature, and temperatures taken during a thermal cool-down, which may be used to compute the temperature response such as a temperature change, a rate of change and/or a thermal decay rate time constant (TC) or thermal TC slope of the multi-sensor component. The thermal TC slopes are then used to determine the absence or presence of an object or medium at the sensor 400/702 as computed by the algorithms and methods 900 and 982 of FIGS. 9A and 9B, respectively in accordance with the present invention.

Plot 1000a and timing diagrams 1030 and 1050 of FIG. 10 illustrate events which take place at exemplary time periods 0-8. For the present example of FIG. 10, the sensor 400/702 is at a temperature of about 95° C. (about 203° F.) just prior to time period 0 at temperature node 1000. Prior to time period 0, the sensor heater 430 of timing diagram 1030 is "off" (1035) with respect to the power supply voltage, and the sensor temperature detector 420 of timing diagram 1050 is "on" and measuring the medium (e.g., water) temperature 1055. In accordance with method 900, heater 430 power 1030 is turned "on" 1040 at time period 0 at temperature node 1000 and the temperature detector may be turned "off" 1060 (or otherwise need not be used) while the sensor heats. After a predetermined time period $td_h$ 1024, after time period 1, the sensor should be fully heated to the expected regulated temperature $T_{hf}$ of the sensor 400/702 at temperature node 1001, which is about 105° C. (about 221° F.) in the present example.

For example, when heated to the expected regulated temperature $T_{hf}$, the temperature signal of the temperature detector 420 may be compared with a known regulated temperature of the sensor 400/702 (or specifically the heater 430), using a measured heater current or power input to the heater 430 to confirm whether the temperature detector 420 of the sensor is presenting an accurate temperature signal to the controller/analyzer 407.

The temperature detector 420 may be verified 1065 at or after time period 1, by comparing the temperature detector 420 measurement $T_{mi}$ 1065 to that of the expected regulation temperature $T_{hf}$ of the sensor 400/702. In addition, if a predetermined delay time ($td_h$ 1024) is exceeded (1001 to 1001a) during the sensor warm-up before $T_{mi}$ achieves a predetermined percentage of the expected regulation temperature $T_{hf}$, a sensor failure may be indicated. Alternately, a warm-up thermal TC slope may be computed to determine such a possible sensor failure. As power remains on the heater 430, after time period 1, the sensor 400/702 continues to heat but stays at the expected regulation temperature $T_{hf}$. At time period 2 the medium presence portion of the method 900 (steps 930 to 960) ensues, wherein a thermal cool-down slope is identified. At time period 2, the heater 430 is turned "off" 1035 and a last expected regulated temperature $T_{mi}$ measurement 1065 is recorded for future reference at temperature node 1002.

Between time periods 2 and 3, as the sensor 400/702 cools down toward the temperature of the surrounding medium, the temperature detector 420 is again measured 1070 to determine the temperature response comprising one of a temperature change, a rate of change and a thermal decay rate time constant (TC) or slope (slope 1). At time period 3, a final temperature measurement $T_{mf}$ may be taken for calculation of the slope 1 (1070). The temperature difference between the expected regulation temperature $T_{mi}$ and the final temperature measurement $T_{mf}$ divided by the elapsed time (td$_c$, 1026) between these temperatures may be used for computation of slope 1. Alternately, two or more temperature measurements, such as 1002a and 1002b, and the elapsed time between the two measurements may be used for computation of slope 1. If the temperature response of slope 1 is low as illustrated between time periods 2 and 3, the medium may be indicated as absent from contact with the sensor. Between time periods 3 and 4, heater power remains "off" 1035 and the temperature of the surrounding medium may be measured 1055 using the temperature detector 420. This completes one full thermal cycle of the sensor wherein the temperature and presence of the medium (e.g., water, 510) is detected.

For example, when a low water cut-off condition is encountered in a boiler, the medium (e.g., water) loses contact with the sensor and the computed slope is lower than a first expected TC limit. In such a case, water would likely be added to the boiler system, for example.

Another thermal cycle of the sensor is illustrated starting at time period 4, wherein heater power is again applied 1040 to heat the sensor to the expected regulation temperature $T_{mi}$ at time period 5, which is about 105° C. (about 221° F.) in the present example. The method continues between time periods 4-8 as described before between time periods 0-4, wherein a sensor verification temperature is taken between time periods 5 and 6, the allowable sensor warm-up time delay is verified (td$_h$ 1024), and another TC slope (slope 2) is determined over elapsed time (td$_c$, 1028) between two or more temperature measurements, such as 1006a and 1006b used for computation of slope 2 for indicating the presence of the medium. In this example, slope 2 illustrates a higher slope rate that may be an indication of the presence of the medium at the sensor. For example, if water is now present at the sensor of the boiler example, the TC slope level, slope 2 is higher than the first expected TC limit. If however, slope 2 is less than a second expected TC slope level, this may be an indication of another possible sensor or system failure condition.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising."

What is claimed is:

1. A fail-safe multi-sensor component for a heating, ventilating, or air-conditioning (HVAC) system, comprising:
    a sensor assembly, comprising
        a temperature detector operable to measure a temperature of an object or a medium;
        a presence detector operable to detect the presence of the object or medium in contact with the multi-sensor component; and
        a pressure detector operable to measure a pressure of the medium against the multi-sensor component;
        a heater having a first element and a second element, the first element driven by a first current and the second element driven by a second current; and
        a controller connected to the temperature detector and the heater, wherein the controller is configured to insure failsafe operations of the temperature detector and to individually drive the first element and the second element separately while measuring the first current and the second current,
        wherein the temperature detector, the presence detector and the pressure detector are separate, distinct elements integrated onto a single substrate; and
    a sensor housing comprising the temperature detector, the presence detector and the pressure detector affixed therein on the single substrate.

2. The fail-safe multi-sensor component of claim 1, wherein the presence detector comprises a heater operable to either heat the multi-sensor component to an expected temperature as measured by the temperature detector or to heat the multi-sensor component with a predetermined energy, and wherein in a heating mode the multi-sensor component is either heated by the heater to the expected temperature as measured by the temperature detector or is heated with the predetermined energy, and wherein in a cooling mode the multi-sensor component cools toward a temperature associated with the object or medium, and the temperature detector provides temperature data indicative of a temperature response comprising one of a temperature change, a rate of change, and a time constant of a thermal decay rate of the multi-sensor component and the presence of the object or medium.

3. The fail-safe multi-sensor component of claim 2, wherein the temperature detector comprises at least one of an resistance temperature detector (RTD), a positive temperature coefficient (PTC) thermistor, a negative temperature coefficient (NTC) thermistor, a platinum resistance wire element, a thermocouple, and an integrated circuit temperature detector, wherein the temperature detector, operating in combination with the resistance heating element in the heating and cooling modes, is operable to provide the temperature data indicative of the temperature response of the multi-sensor component, the presence of the object or medium, and a confirmation of fail-safe operation of the multi-sensor component.

4. The fail-safe multi-sensor component of claim 1, wherein
   the presence detector the heater; and
   the pressure detector comprises a full-wave strain gage bridge.

5. The fail-safe multi-sensor component of claim 4, wherein
   the heater comprises two resistive elements deposited as traces on the single substrate; and
   the pressure detector comprises four resistive elements deposited as traces on the single substrate interconnected in a full-wave strain gage bridge configuration.

6. The fail-safe multi-sensor component of claim 1, wherein the sensor housing further comprises wet and dry opposing sides, the wet side in direct contact with the object or medium, and the dry side comprising the temperature detector, the presence detector and the pressure detector affixed to the dry side, the sensor housing further providing support and electrical isolation for terminals of the temperature detector, the presence detector and the pressure detector within the sensor housing.

7. The fail-safe multi-sensor component of claim 6, wherein the presence detector comprises the heater operable to either heat the multi-sensor component to an expected temperature as measured by the temperature detector or to heat the multi-sensor component with a predetermined energy and wherein the controller is configured to measure a voltage produced by the pressure detector and to provide a pressure signal therefrom.

8. The fail-safe multi-sensor component of claim 6, wherein the sensor housing comprises a material comprising one or more of a non-metallic, low thermal conductivity material and Noryl.

9. The fail-safe multi-sensor component of claim 6, wherein the fail-safe multi-sensor component is affixed at a location in the heating, ventilating, or air-conditioning (HVAC) system to provide thermal contact with one of the object and the medium on the wet side of the sensor housing, wherein the location is representative of a fail-safe operation level of the object or medium, respectively.

10. The fail-safe multi-sensor component of claim 6, wherein the temperature detector, the presence detector and the pressure detector are deposited as one or more metals onto a Kapton material surface which is molecularly bonded onto the dry side of the sensor housing.

11. The fail-safe multi-sensor component of claim 1, wherein the controller is further configured to interpret the temperature data wherein the presence of the object or medium at the multi-sensor component may be determined in a fail-safe manner by calculating a temperature response comprising one of a temperature change, a rate of change, and a time constant of the thermal decay rate of the multi-sensor component upon cooling from an expected temperature as measured by the temperature detector or after heating the multi-sensor component with a predetermined energy.

12. The fail-safe multi-sensor component of claim 1, further comprising:
   a memory storage component; and
   wherein the controller is operably coupled to the storage component, the controller having a temperature, pressure and presence detection algorithm used by the controller to detect the temperature, pressure and presence, respectively, of a medium in contact with respective sensors and to detect sensor failures;
   wherein temperature signals and object or medium presence signals generated by respective sensors are provided to the controller and utilized within the temperature and presence detection algorithm by the controller to generate a sensor temperature and a sensor temperature response computation, the level of which provides one or a combination of an indication of a low medium alarm, a medium presence signal and a sensor alarm;
   and wherein pressure signals generated by respective sensors are provided to the controller and utilized within the pressure detection algorithm by the controller to generate a sensor pressure computation, the level of which provides one or a combination of an indication of a pressure detection, an over-pressure alarm, and a sensor alarm.

13. The fail-safe multi-sensor component of claim 12, wherein the controller is operable to measure the resistance of the temperature detector of the one or more multi-sensor components to provide the temperature signals, and to measure a differential voltage produced by a strain-gage bridge in each pressure detector of the one or more multi-sensor components to provide the pressure signals.

14. The fail-safe multi-sensor component of claim 12, wherein the controller is operable to receive one or more sensor parametric inputs provided by the manufacturer.

15. The fail-safe multi-sensor component of claim 1, further comprising a controller residing in the sensor housing and electrically connected to the temperature detector, the presence detector and the pressure detector, respectively, wherein the controller is configured to provide signal conditioning to signals supplied by the temperature detector and the pressure detector, respectively.

16. A multi-sensor component for detecting water temperature, water pressure, and the presence of water in a boiler, comprising:
   a temperature detector, a heater and a pressure detector provided within a single sensor housing;
   the heater comprising first and second resistive elements, the first element driven by a first current and the second element driven by a second current;
   the pressure detector operable to measure a pressure of the water against the sensor housing,
   wherein the temperature detector, the heater, and the pressure detector are separate, distinct elements integrated on a single substrate within the sensor housing;
   wherein the multi-sensor component is configured to be located at a low water cut-off level location in the boiler for immersion by the water on a wet side of the sensor housing, and wherein a controller is configured to be connected to electrical terminals of the temperature detector, the heater, and the pressure detector affixed to a dry side of the sensor housing, and
   wherein the temperature detector comprises two resistance temperature detectors (RTDs), and wherein the controller is configured to individually drive the first element and the second element separately while measuring the first current and the second current and to issue a heater failure alarm upon the first or second current not meeting an expected current.

17. The multi-sensor component of claim 16, wherein the heater is operable in a heating mode to either heat the multi-sensor component to an expected temperature as measured by the temperature detector or to heat the multi-sensor component to the expected temperature with a predetermined energy, and wherein in a cooling mode, the heater cools toward the temperature associated with the water measured by the temperature detector, and wherein the controller calculates a temperature response comprising one of a temperature change, a rate of change, and a time constant of the thermal decay rate of the multi-sensor component based on the measurements of the expected temperature and the temperature of the water, the temperature response indicative of the presence of water against the wet side of the multi-sensor component, and wherein the controller also determines the pressure of the water against the wet side of the multi-sensor component.

18. The multi-sensor component of claim 16, wherein
the heater comprises two deposited resistive elements deposited as traces on the single substrate; and
the pressure detector comprises a full-wave strain gage bridge.

19. The multi-sensor component of claim 16, wherein
the heater comprises two resistive elements deposited as traces on the single substrate; and
the pressure detector comprises four resistive elements deposited as traces on the single substrate interconnected in a full-wave strain gage bridge configuration;
wherein the two resistive heating elements and the two temperature detectors provide redundancy for fail-safe operation.

20. The multi-sensor component of claim 16, wherein the heater comprises two resistive heating elements, and wherein the controller is configured to measure a current to each of the resistive heating elements to insure failsafe operations thereof, and to measure a voltage produced by the pressure detector and to provide a pressure signal therefrom.

21. The multi-sensor component of claim 16, further comprising:
a memory storage component; and
wherein the controller is operably coupled to the storage component, the controller having a temperature, pressure and presence detection algorithm used by the controller to detect the temperature, pressure and presence, respectively, of the water in contact with respective sensors and to detect sensor failures;
wherein temperature signals generated by the temperature detector of the one or more multi-sensor components are provided to the controller and utilized within the temperature and presence detection algorithm by the controller to generate a sensor temperature and a sensor temperature response computation, the level of which provides one or a combination of an indication of a low water alarm, a water presence signal and a sensor alarm;
and wherein pressure signals generated by respective one or more multi-sensor components are provided to the controller and utilized within the pressure detection algorithm by the controller to generate a sensor pressure computation, the level of which provides one or a combination of an indication of a pressure detection, an over-pressure alarm, and a sensor alarm.

22. The multi-sensor component of claim 21, wherein the controller is operable to receive one or more sensor parametric inputs provided by the manufacturer.

23. The multi-sensor component of claim 22, wherein respective multi-sensor components are further operable to digitally communicate to the controller one or more of the temperature signals, the pressure signals, the water presence signal, one or more of the sensor parametric inputs, a sensor model, a sensor serial number, a manufacturing date, a calibration temperature and a calibration pressure.

24. The multi-sensor component of claim 16, wherein the controller resides in the sensor housing and is electrically connected to the temperature detector, the heater and the pressure detector, respectively, and wherein the controller is configured to provide signal conditioning to signals supplied by the temperature detector, and the pressure detector, respectively.

* * * * *